(12) United States Patent
Tandon et al.

(10) Patent No.: US 12,535,637 B2
(45) Date of Patent: Jan. 27, 2026

(54) UNCOUPLED MULTICORE OPTICAL FIBER WITH ALKALI DOPED, OFF-SET TRENCH CORES

(71) Applicant: CORNING INCORPORATED, Corning, NY (US)

(72) Inventors: Pushkar Tandon, Painted Post, NY (US); Aramais Robert Zakharian, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 265 days.

(21) Appl. No.: 18/358,162

(22) Filed: Jul. 25, 2023

(65) Prior Publication Data

US 2024/0053531 A1 Feb. 15, 2024

Related U.S. Application Data

(60) Provisional application No. 63/464,281, filed on May 5, 2023, provisional application No. 63/397,524, filed on Aug. 12, 2022.

(51) Int. Cl.
*G02B 6/02* (2006.01)
*G02B 6/028* (2006.01)
*G02B 6/036* (2006.01)

(52) U.S. Cl.
CPC ..... *G02B 6/02042* (2013.01); *G02B 6/02019* (2013.01); *G02B 6/0288* (2013.01); *G02B 6/0365* (2013.01)

(58) Field of Classification Search
CPC ............ G02B 6/02019; G02B 6/02042; G02B 6/0288; G02B 6/0365; G02B 6/03672; G02B 6/03683
See application file for complete search history.

(56) References Cited

U.S. PATENT DOCUMENTS

| 7,536,076 B2 | 5/2009 | Khrapko et al. |
| 11,370,689 B2 | 6/2022 | Khrapko |

(Continued)

FOREIGN PATENT DOCUMENTS

| EP | 3276384 A1 | 1/2018 | |
| NL | 2025984 B1 * | 12/2021 | ........... G02B 6/0286 |
| WO | 2022/035630 A1 | 2/2022 | |

OTHER PUBLICATIONS

English translation of NL-2025984-B1 (Year: 2020).*

(Continued)

*Primary Examiner* — Uyen Chau N Le
*Assistant Examiner* — Darby M. Thomason
(74) *Attorney, Agent, or Firm* — Yiqun Zhao

(57) ABSTRACT

Embodiments of current disclosure include a multicore optical fiber including a common-cladding region having a refractive index $\Delta_{cc}$ and an outer radius $R_{CC}$; and at least two core portions disposed within the common-cladding region, wherein each core portion includes a central axis, a core region extending from the central axis to an outer radius $r_i$, wherein each of the at least two core portions is doped with a dopant from a group including sodium, potassium, rubidium or combination thereof, an inner-cladding region encircling and directly contacting the core region and extending from the outer radius $r_1$ to an outer radius $r_2$, a trench region encircling and directly contacting the inner cladding region and extending from the outer radius $r_2$ to an outer radius $r_3$, the trench region having a trench volume greater than or equal to 20% $\Delta$ micron$^2$ and less than or equal to 60% $\Delta$ micron$^2$.

20 Claims, 11 Drawing Sheets

(56) References Cited

U.S. PATENT DOCUMENTS

| | | | | |
|---|---|---|---|---|
| 2013/0243381 A1* | 9/2013 | Hayashi | ............ | G02B 6/02266 385/124 |
| 2017/0351022 A1 | 12/2017 | Nakanishi et al. | | |
| 2021/0294029 A1* | 9/2021 | Bickham | ............ | G02B 6/02009 |
| 2022/0043201 A1* | 2/2022 | Bickham | ............ | G02B 6/02042 |

OTHER PUBLICATIONS

International Search Report and Written Opinion of the International Searching Authority; PCT/US2023/029684; dated Nov. 16, 2023; 12 pages; European Patent Office.

"Tetsuya Hayashi et al., "Uncoupled Multi-Core Fiber Design for Practical Bidirectional Optical Communications," OFC, Optica Publishing Group, 2022".

Akihide Sano et al., "Crosstalk-Managed High Capacity Long Haul Multicore Fiber Transmission With Propagation-Direction Interleaving," Journal of Lightwave Technology, vol. 32, No. 16, pp. 2771-2779, published Aug. 15, 2014.

Dar et al., "Submarine Cable Cost Reduction Through Massive SDM", European Conference on Optical Communication, 2017.

Desbruslais, Maximizing the Capacity of Ultra-Long Haul Submarine Systems, 20th European Conference on Networks and Optical Communications, 2015, pp. 1-6.

Lukasz Szostkiewicz, et al., "Cross talk analysis in multicore optical fibers by supermode theory," Optics Letters, vol. 41, No. 16, p. 3759-3762, published Aug. 15, 2016.

M. Koshiba, et al., "Analytical Expression of Average Power-Coupling Coefficients for Estimating Intercore Crosstalk in Multicore fibers," IEEE Photonics J., vol. 4, No. 5, 2012, pp. 1987-1995.

M. Li, et al., "Coupled Mode Analysis of Crosstalk in Multicore fiber with Random Perturbations," in Optical Fiber Communication Conference, OSA Technical Digest (online), Optical Society of America, 2015, paper W2A.35.

Shoichiro Matsuo, et al., "Crosstalk behavior of cores in multi-core portion under bent condition," IEICE Electronics Express, vol. 8, No. 6, pp. 385-390, published Mar. 25, 2011.

Sinkin et al., "SDM Concepts for Submarine Transmission", Advanced Photonics Congress, paper # NeTh2B.1, 2017.

Soma et al., "50.47-Tbit/s Standard Cladding Coupled 4-Core Fiber Transmission Over 9, 150 km", Journal of Lightwave Technology, vol. 39, No. 22, 2021, pp. 7099-7105.

T. Hayashi, et al., "Physical Interpretation of Intercore Crosstalk in Multicore fiber: Effects of Macrobend, Structure Fluctuation, and Microbend," Optics Express, vol. 21, No. 5, 2013, pp. 5401-5412.

Tamura et al., "Low-Loss Uncoupled Two-Core Fiber for Power Efficient Practical Submarine Transmission", OFC Conference Paper M1.E.5, 2019, pp. 1-3.

* cited by examiner

UNCOUPLED MULTICORE OPTICAL FIBER WITH ALKALI DOPED, OFF-SET TRENCH CORES

CROSS-REFERENCE TO RELATED APPLICATIONS

This application claims the benefit of priority of U.S. Provisional Application Ser. No. 63/464,281 filed on May 5, 2023, and U.S. Provisional Application Ser. No. 63/397,524 filed on Aug. 12, 2022, the contents of which are relied upon and incorporated herein by reference in their entireties.

FIELD

The present disclosure pertains to optical fibers. More particularly, the present disclosure relates to multicore optical fibers having alkali-doped, off set core portions.

BACKGROUND

Increased bandwidth requirements are driving the use of Space Division Multiplexing (SDM) in telecommunication systems. Multicore optical fibers are one class of SDM fibers. The need to pack an increased number of cores in the multicore fibers while still keeping the outer nominal diameter of the optical fiber close to the conventional fibers (e.g. about 125 microns) results in a proximity of the cores to each other and to the outer periphery of the optical fiber. This proximity results in increased cross-talk and radiation losses, thereby negatively impacting the attenuation for each of the cores, particularly the end cores. Traditional methods of reducing cross-talk and radiation loss has been to have cores with smaller Mode-Field-Diameters (MFD) such that the field overlap between the adjacent cores and between core and fiber edge is minimized. However, these MFDs are not matched to nominal MFDs of conventional fibers and result in increased coupling losses when connected to such conventional fibers.

Accordingly, the inventors have developed improved multicore fibers having alkali-doped, off set core portions.

SUMMARY

A first aspect of the present disclosure includes an uncoupled core multicore optical fiber, comprising: a common-cladding region having a refractive index $\Delta_{cc}$ and an outer radius $R_{CC}$; and two core portions disposed within the common-cladding region, wherein each core portion comprises: a central axis, a core region extending from the central axis to an outer radius $r_1$, the core region comprising a relative refractive index $\Delta_1$ relative to pure silica, wherein each of the two core portions is doped with a dopant from a group comprising sodium, potassium, rubidium or combination thereof, an inner-cladding region encircling and directly contacting the core region and extending from the outer radius $r_1$ to an outer radius $r_2$, the inner cladding region comprising a relative refractive index $\Delta_2$ relative to pure silica, a trench region encircling and directly contacting the inner cladding region and extending from the outer radius $r_2$ to an outer radius $r_3$, the trench region comprising a relative refractive index $\Delta_3$ relative to pure silica and having a trench volume greater than or equal to 20% $\Delta$ micron$^2$ and less than or equal to 60% $\Delta$ micron$^2$, the common cladding region encircling and directly contacting the trench region and extending from the outer radius $r_3$ to an outer radius $r_{cc}$, and wherein the cable cutoff of each core portion is less than 1530 nm, wherein an effective area of each core portion is greater than or equal to 100 µm$^2$ and less than or equal to 135 µm$^2$ at a wavelength of 1550 nm and wherein the central axes of the two core portions are separated from one another by a minimum separation distance that is greater than or equal to 45 microns and less than or equal to 60 microns.

A second aspect of the present disclosure may include the first aspect, wherein the outer diameter $2 \times R_{CC}$ of the common cladding is greater than or equal to 120 µm and less than or equal to 130 µm.

A third aspect of the present disclosure may include the first aspect, wherein the outer radius diameter $2 \times R_{CC}$ of the common cladding is greater than or equal to 124 µm and less than or equal to 126 µm.

A fourth aspect of the present disclosure may include any of the first through third aspects, wherein effective area of each of the core portions is greater than or equal to 110 µm$^2$ and less than or equal to 130 µm$^2$ at a wavelength of 1550 nm A fifth aspect of the present disclosure may include any of the first through fourth aspects, wherein the multicore optical fiber has an average attenuation of less than 0.16 dB/km.

A sixth aspect of the present disclosure may include any of the first through fifth aspects, wherein the trench volume of the trench region is greater than or equal to 30% $\Delta$ micron$^2$ and less than or equal to 55% $\Delta$ micron$^2$.

A seventh aspect of the present disclosure may include any of the first through sixth aspects, wherein the core radius $r_1$ is greater than or equal to 3.0 microns and less than or equal to 7.0 microns.

An eighth aspect of the present disclosure may include any of the first through seventh aspects, wherein the outer radius $r_3$ of the trench region is about 11 microns to about 20 microns.

A ninth aspect of the present disclosure may include any of the first through eighth aspects, wherein the mode field diameter of each core portion is about 11 µm to about 15 µm at a 1550 nm wavelength.

A tenth aspect of the present disclosure may include any of the first through ninth aspects, wherein a cable cutoff wavelength of each of the plurality of core portions is greater than or equal to 1300 nm and less than or equal to 1530 nm.

An eleventh aspect of the present disclosure may include any of the first through tenth aspects, wherein the central axes of the two core portions are separated from one another by a minimum separation distance that is greater than or equal to 48 microns and less than or equal to 55 microns.

A twelfth aspect of the present disclosure may include any of the first through eleventh aspects, wherein a cross-talk between the two core portions is less than or equal to −30 dB/100 km of optical fiber.

A thirteenth aspect of the present disclosure may include any of the first through eleventh aspects, wherein a cross-talk between the two core portions is less than or equal to −40 dB/100 km of optical fiber.

A fourteenth aspect of the present disclosure may include any of the first through eleventh aspects, wherein a cross-talk between the two core portions is less than or equal to −50 dB/100 km of optical fiber.

A fifteenth aspect of the present disclosure may include any of the first through fourteenth aspects, wherein the refractive index profile of each core portion within the core region is a graded index profile.

A sixteenth aspect of the present disclosure may include any of the first through fifteenth aspects, wherein the relative refractive index $\Delta_3$ of the trench region of each core portion continuously decreases from $\Delta_2$ at the radius $r_2$ to a minimum relative refractive index $\Delta_{3min}$ at $r_3$ such that the trench has a substantially triangular-shape.

A seventeenth aspect of the present disclosure may include any of the first through sixteenth aspects, wherein the relative refractive index $\Delta_3$ of the trench region of each core portion remains substantially constant at a minimum relative refractive index $\Delta_{3min}$ in from the radius $r_2$ to radius $r_3$ such that the trench region has a substantially rectangular-shape.

An eighteenth aspect of the present disclosure may include any of the first through seventeenth aspects, wherein the average concentration of the alkali in the core portion is in the range from 20 ppm to 500 ppm.

A nineteenth aspect of the present disclosure may include any of the first through seventeenth aspects, wherein the average concentration of the alkali in the core portion is in the range from 50 ppm to 300 ppm.

A twentieth aspect of the present disclosure may include any of the first through nineteenth aspects, wherein the cable cutoff of each core portion is less than 1530 nm.

A twenty-first aspect of the present disclosure may include any of the first through nineteenth aspects, wherein the cable cutoff of each core portion is less than 1450 nm.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
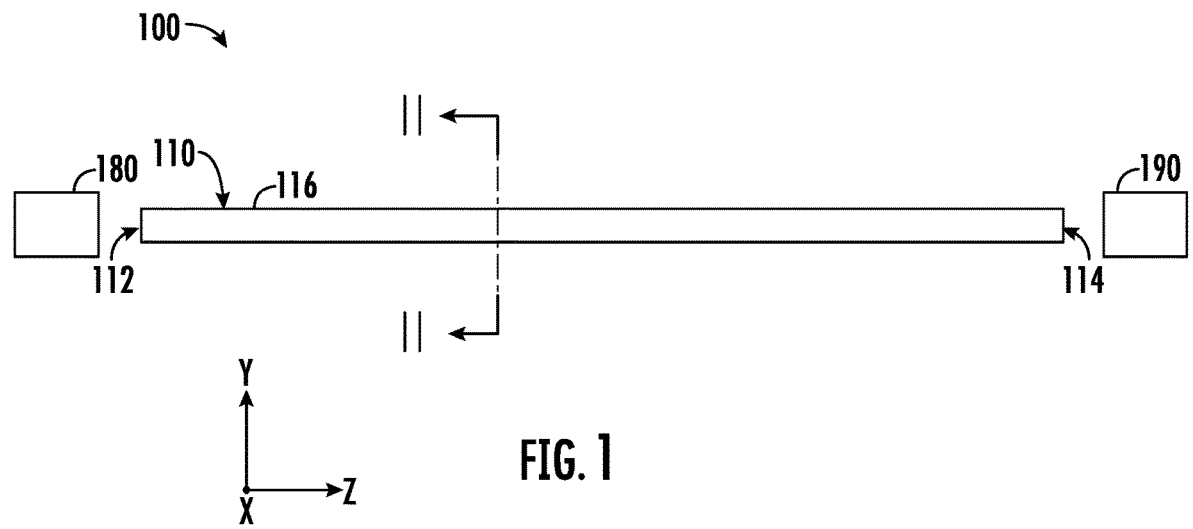
FIG. 1 schematically depicts an optical system including a signal source, a multicore optical fiber, and a photodetector, according to one or more embodiments shown and described herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure. The claims as set forth below are incorporated into and constitute part of this Detailed Description.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

In embodiments, the multicore optical fiber disclosed herein includes a plurality of core portions. In embodiments, the multicore optical fiber disclosed herein includes two core portions. Each of the plurality of core portions may include a central axis and a core region extending from the central axis to a radius $r_1$. The core region comprises a relative refractive index $\Delta_1$ relative to pure silica. An inner cladding region may encircle and directly contact the core region and extend from the radius $r_1$ to a radius $r_2$. The inner cladding region may have a relative refractive index $\Delta_2$ relative to pure silica. A depressed cladding region may encircle and directly contact the inner cladding region and extend from the radius $r_2$ to a radius $r_3$. The depressed cladding region may include a relative refractive index $\Delta_3$ relative to pure silica and a minimum relative refractive index $\Delta_{3min}$ relative to pure silica. An outer common cladding region may encircle and directly contact the depressed cladding region and extending from the radius $r_3$ to a outer fiber radius $R_{cc}$. The outer common cladding region may include a relative refractive index $\Delta_{cc}$ relative to pure silica and a minimum relative refractive index $\Delta_{ccmin}$ relative to pure silica. Various embodiments of multicore optical fibers will be described herein in further detail with specific reference to the appended drawings.

In this specification and in the claims which follow, reference will be made to a number of terms which shall be defined to have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

A multicore optical fiber, also referred to as a multicore optical fiber or "MCF", is considered for the purposes of the present disclosure to include two or more core portions disposed within a common cladding. Each core portion can be considered as having a higher index core region surrounded by a lower index inner cladding region and an outer cladding region. As used herein, the term "inner core portion" refers to the higher index core region. That is, a core portion may include an inner core portion and one or more lower index inner claddings.

"Radial position" and/or "radial distance," when used in reference to the radial coordinate "r" refers to radial position relative to the centerline (r=0) of each individual core portion in a multicore optical fiber. "Radial position" and/or "radial distance," when used in reference to the radial coordinate "R" refers to radial position relative to the centerline (R=0, central fiber axis) of the multicore optical fiber.

The length dimension "micrometer" may be referred to herein as micron (or microns) or μm.

The "refractive index profile" is the relationship between refractive index or relative refractive index and radial distance r from the core portion's centerline for each core portion of the multicore optical fiber. For relative refractive index profiles depicted herein as relatively sharp boundaries between various regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to multicore optical fibers and fiber cores of multicore optical fibers is defined according to equation (1):

$$\Delta\% = 100\frac{n^2(r) - n_c^2}{2n^2(r)} \quad (1)$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by Δ (or "delta") or Δ% (or "delta %") and its values are given in units of "%" or "% Δ", unless otherwise specified. Relative refractive index may also be expressed as Δ(r) or Δ(r) %. When the refractive index of a region is less than the reference index $n_c$, the relative refractive index is negative and can be referred to as a trench. When the refractive index of a region is greater than the reference index $n_c$, the relative refractive index is positive, and the region can be said to be raised or to have a positive index.

The average relative refractive index of a region of the multicore optical fiber can be defined according to equation (2):

$$\Delta\% = \frac{\int_{r_{inner}}^{r_{outer}} \Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The term "α-profile" (also referred to as an "alpha profile") refers to a relative refractive index profile Δ(r) that has the following functional form (3):

$$\Delta(r) = \Delta(r_0)\left\{1 - \left[\frac{|r - r_0|}{(r_1 - r_0)}\right]^\alpha\right\} \quad (3)$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the final point of the α-profile, and α is a real number. In some embodiments, examples shown herein can have a core alpha of $1 \leq \alpha \leq 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to an α-profile, where α≥10.

The "effective area" can be defined as (4):

$$A_{eff} = \frac{2\pi\left[\int_0^\infty (f(r))^2 r dr\right]^2}{\int_0^\infty (f(r))^4 r dr} \quad (4)$$

where f(r) is the transverse component of the electric field of the guided optical signal and r is radial position in the fiber. "Effective area" or "$A_{eff}$" depends on the wavelength of the optical signal. Specific indication of the wavelength will be made when referring to "Effective area" or "$A_{eff}$" herein. Effective area is expressed herein in units of "$\mu m^2$", "square micrometers", "square microns" or the like.

Unless otherwise noted herein, optical properties (such as dispersion, dispersion slope, etc.) are reported for the LP01 mode.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero-dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm$^2$/km, respectively. Chromatic dispersion is measured as specified by the IEC 60793-1-42:2013 standard, "Optical fibres—Part 1-42: Measurement methods and test procedures—Chromatic dispersion."

The cutoff wavelength of an optical fiber is the minimum wavelength at which the optical fiber will support only one propagating mode. For wavelengths below the cutoff wavelength, multimode transmission may occur, and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

The term "attenuation," as used herein, is the loss of optical power as the signal travels along the optical fiber. Attenuation is measured as specified by the IEC 60793-1-40:2019 standard entitled "Optical fibres—Part 1-40: Attenuation measurement methods."

As used herein, the multicore optical fiber can include a plurality of core portions, wherein each core portion can be defined as an $i^{th}$ core portion (i.e., $1^{st}$, $2^{nd}$, $3^{rd}$, $4^{th}$, etc . . . ). Each $i^{th}$ core portion can have an outer radius $r_{Ci}$. In embodiments, the outer radius $r_{Ci}$ of each core portion corresponds to an outer radius $r_4$ of an outer cladding region of that core portion. Each $i^{th}$ core portion is disposed within a cladding matrix of the multicore optical fiber, which defines a common cladding of the multicore optical fiber. The common cladding includes a relative refractive index $\Delta_{CC}$ and an outer radius $R_{CC}$.

According to one aspect of the present disclosure, the core region forms the central portion of each core portion within the multicore optical fiber and is substantially cylindrical in shape. When two regions are directly adjacent to each other, the outer radius of the inner of the two regions coincides with the inner radius of the outer of the two regions. For example, in embodiments in which an inner cladding region surrounds and is directly adjacent to a core region, the outer radius of the core region coincides with the inner radius of the inner cladding region.

An "up-dopant" is a substance added to the glass of the component being studied that has a propensity to raise the refractive index relative to pure undoped silica. A "down-dopant" is a substance added to the glass of the component being studied that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "crosstalk" in a multi-core optical fiber is a measure of how much power leaks from one core portion to another, adjacent core portion. As used herein, the term "adjacent core portion" refers to the core that is nearest to the reference core portion. In embodiments, all core portions may be equally spaced from one another, meaning that all core portions are adjacent one another. In other embodiments, the core portions may not be equally spaced from one another, meaning that some core portions will be spaced further from the reference core portion than adjacent core portions are spaced from the reference core portion. The crosstalk can be determined based on the coupling coefficient, which depends on the refractive index profile design of the core portion, the distance between the two adjacent core portions, the structure of the cladding surrounding the two adjacent core portions, and $\Delta\beta$, which depends on a difference in propagation constant $\beta$ values between the two adjacent core portions (e.g., as described herein, two core portions having centerlines separated by a minimum core-to-core separation distance). For two adjacent core portions with power $P_1$ launched into the first core portion, then the power $P_2$ coupled from the first core portion to the second core portion can be determined from coupled mode theory using the following equation (5):

$$P_2 = \frac{L}{L_c}\left\langle\left(\frac{\kappa}{g}\right)^2 \sin^2(g\Delta L)\right\rangle P_1 \quad (5)$$

where $\langle\ \rangle$ denotes the average, L is fiber length, $\kappa$ is the coupling coefficient between the electric fields of the two cores, $\Delta L$ is the length of the fiber, $L_c$ is the correlation length, and g is given by the following equation (6):

$$g^2 = \kappa^2 + \left(\frac{\Delta\beta}{2}\right)^2 \quad (6)$$

where $\Delta\beta$ is the mismatch in propagation constants between the LP01 modes in the two adjacent core portions when they are isolated. The crosstalk (in dB) is then determined using the following equation (7):

$$X = 10\log\left(\frac{P_2}{P_1}\right) = 10\log\left(\frac{L}{L_c}\left|\left(\frac{\kappa}{g}\right)^2 \sin^2(g\Delta L)\right|\right) \quad (7)$$

The crosstalk between the two adjacent core portions increases linearly with fiber length in the linear scale (equation (5)) but does not increase linearly with fiber length in the dB scale (equation (7)). As used herein, crosstalk performance is referenced to a 100 km length L of optical fiber. However, crosstalk performance can also be represented with respect to alternative optical fiber lengths, with appropriate scaling. For optical fiber lengths other than 100 km, the crosstalk between cores can be determined using the following equation (8):

$$X(L) = X(100) + 10\log\left(\frac{L}{100}\right) \quad (8)$$

For example, for a 10 km length of optical fiber, the crosstalk can be determined by adding "−10 dB" to the crosstalk value for a 100 km length optical fiber. For a 1 km length of optical fiber, the crosstalk can be determined by adding "−20 dB" to the crosstalk value for a 100 km length of optical fiber. For long-haul transmission in an uncoupled-core multicore fiber, the crosstalk should be less than or equal to −30 dB, less than or equal to −40 dB, or even less than or equal to −50 dB.

As used herein, with co-propagating cross talk (XT) the power $P_1$ is launched into the first core portion, as described above, at a first end of the optical fiber and the power $P_2$ coupled into the second core portion is determined at a second end of the optical fiber. Therefore, the power $P_2$ coupled into the second core portion is determined at the end of the optical fiber in the propagating direction of the optical signal. As used herein, with counter-propagating cross talk (CXT) the power $P_1$ is launched into the first core portion, as described above, at a first end of the optical fiber and the power $P_2$ coupled into the second core portion is determined at the first end of the optical fiber. Therefore, the power $P_2$ coupled into the second core portion is determined at the end of the optical fiber that is opposite of the propagating direction of the optical signal. Counter-propagating cross talk is generally lower in an optical fiber than co-propagating cross talk.

Figure 10:
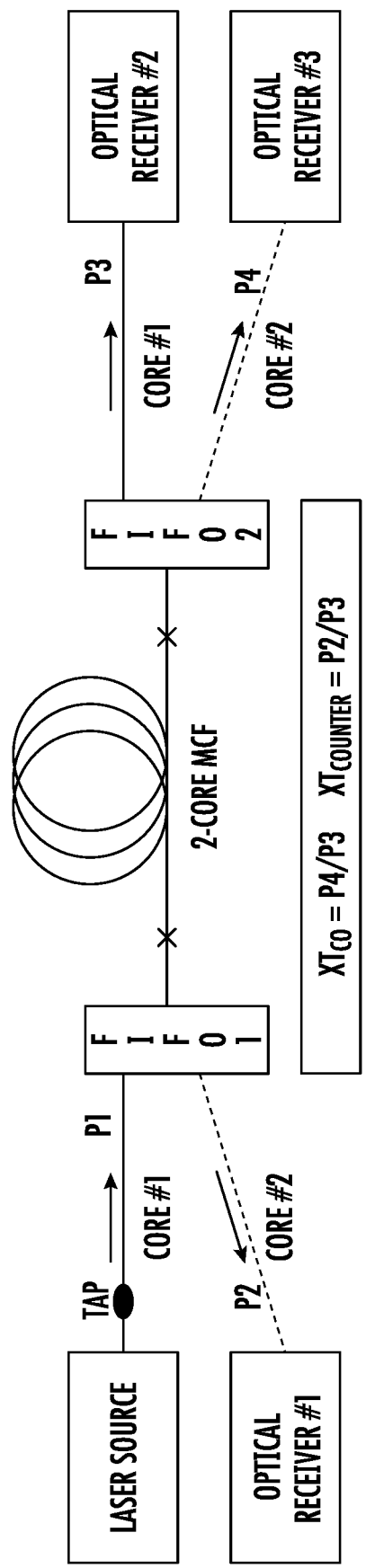
FIG. 10 is schematic drawing of a system to measure co-propagating cross talk and counter-propagating cross talk.

The system to measure co-propagating cross talk and counter-propagating cross talk, as disclosed herein, is shown in FIG. 10. In order to measure the disclosed cross talk, multicore fibers (e.g., multicore fiber with a 1×2 core design) with a length between 20 and 25 km on a standard shipping spool were tested. As shown in FIG. 10, the system comprises a tunable laser source (TLS) with a linewidth of 200 kHz, a tap to monitor the laser output power, and a 1×2 multicore fiber fan-in/fan-out (FIFO 1) spliced to the fiber to inject the source light into one core of the fiber while directing backward propagating light in the other core. A fan-out (FIFO 2) is spliced at the far end of the fiber, and its outputs are connected to optical receivers to measure forward propagating light out of each core. The optical receivers #1, #2, and #3, as shown in FIG. 10, are each a high sensitivity detector with −109 dBm noise sensitivity and linearity error with <20% deviation over the entire power measured range (+5 to −75 dBm). All three optical receivers were calibrated and read out the same power at one power level. The multicore fiber used to fabricate FIFOs had the same mode field diameter and core-to-core pitch as the transmission multicore fiber under test.

Techniques for determining cross talk between cores in a multicore optical fiber can be found in M. Li, et al., "Coupled Mode Analysis of Crosstalk in Multicore fiber with Random Perturbations," in Optical Fiber Communication Conference, OSA Technical Digest (online), Optical Society of America, 2015, paper W2A.35, and Shoichiro Matsuo, et al., "Crosstalk behavior of cores in multi-core portion under bent condition," IEICE Electronics Express, Vol. 8, No. 6, p. 385-390, published Mar. 25, 2011 and Lukasz Szostkiewicz, et al., "Cross talk analysis in multi-core optical fibers by supermode theory," Optics Letters, Vol. 41, No. 16, p. 3759-3762, published Aug. 15, 2016, the contents of which are all incorporated herein by reference in their entirety. Furthermore, techniques for determining co-propagating and counter-propagating cross talk between cores in a multicore optical fiber can be found in Akihide Sano et al., "Crosstalk-Managed High Capacity Long Haul Multicore Fiber Transmission With Propagation-Direction Interleaving," Journal of Lightwave Technology, Vol. 32, No. 16, p. 2771-2779, published Aug. 15, 2014 and Tetsuya Hayashi et al., "Uncoupled Multi-Core Fiber Design for Practical Bidirectional Optical Communications," OFC, Optica Publishing Group, 2022, which are also incorporated by reference in their entirety.

The phrase "coupling coefficient" κ, as used herein, is related to the overlap of electric fields when the two cores are close to each other. The square of the coupling coefficient, $\kappa^2$, is related to the average power in core m as influenced by the power in other cores in the multicore optical fiber. The "coupling coefficient" can be estimated using the coupled power theory, with the methods disclosed in M. Koshiba, K. Saitoh, K. Takenaga, and S. Matsuo, "Analytical Expression of Average Power-Coupling Coefficients for Estimating Intercore Crosstalk in Multicore fibers," IEEE Photonics J., 4(5), 1987-95 (2012); and T. Hayashi, T. Sasaki, E. Sasaoka, K. Saitoh, and M. Koshiba, "Physical Interpretation of Intercore Crosstalk in Multicore fiber: Effects of Macrobend, Structure Fluctuation, and Microbend," Optics Express, 21(5), 5401-12 (2013), the contents of which are incorporated by reference herein in their entirety.

The mode field diameter (MFD) is measured using the Petermann II method and was determined from:

$$MFD = 2w \quad (9)$$

$$w = \frac{\int_0^\infty (f(r))^2}{\int_0^\infty \left(\frac{df(r)}{dr}\right)^2 r dr} \quad (10)$$

where f(r) is the transverse component of the electric field distribution of the guided light and r is the radial position in the fiber. Unless otherwise specified, "mode field diameter" or "MFD" refers to the mode field diameter at 1310 nm.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the term "substantially free," when used to describe the concentration and/or absence of a particular up-dopant or down-dopant in a particular portion of the fiber, means that the constituent component is not intentionally added to the fiber. However, the fiber may contain traces of the constituent component as a contaminant or tramp in amounts of less than 0.15 wt. %.

As used herein, the singular forms "a," "an" and "the" include plural referents unless the context clearly dictates otherwise. Thus, for example, reference to "a" component includes aspects having two or more such components, unless the context clearly indicates otherwise.

Multicore optical fibers are attractive for a number of optical fiber applications, including their use for increasing fiber density to overcome cable size limitations in telecommunications systems. In such applications, it is beneficial to increase the fiber density to maintain compactness of the multicore optical fiber (e.g., to provide a multicore optical fiber having a diameter to match the diameter of conventional optical fiber used for such applications, such as diameters of approximately 125 µm) while providing relatively high fiber counts as compared to conventional optical fibers used for such applications. Conventional approaches for achieving high fiber densities within such multicore optical fibers while reducing cross-talk between the cores of the multicore optical fiber have included reducing the mode field diameter. Such reduction in mode field diameter may reduce cross-talk between the core portions, but creates difficulties in the amount of power that can be launched in each core.

The multicore optical fibers described herein address these deficiencies of conventional approaches to providing high fiber density in relatively small multicore optical fibers. In particular, by incorporating core portions comprising a core region, an inner cladding region, a depressed cladding region with a trenched refractive index profile, and an outer cladding region, the multicore optical fibers described herein provide large effective area, relatively low cross-talk (e.g., less than −30 dB, less than −40 dB, or even less than −50 dB), low tunneling loss from corner fibers to the edge of the fiber, and good bending performance.

Figure 2:
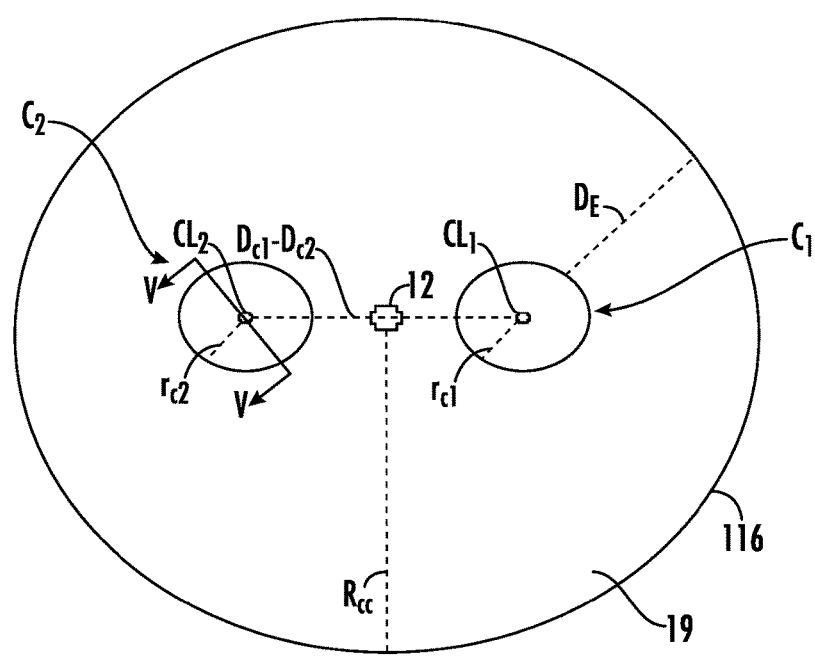
FIG. 2 schematically depicts a cross-section of the multicore optical fiber depicted in FIG. 1, according to one or more embodiments described herein.

Referring now to FIGS. 1 and 2, an optical system 100 comprising an uncoupled-core multicore optical fiber 110 with a plurality of core portions $C_1$ and $C_2$, a signal source 180, and a photodetector 190 is schematically depicted. The signal source 180 may produce multiple modulated signals such as those produced by distributed feedback lasers (DFB) or vertical-cavity surface-emitting lasers (VCSEL). The uncoupled-core multicore optical fiber 110 comprises an input end 112 optically coupled to the signal source 180, an output end 114 optically coupled to the photodetector 190, and an outer surface 116. In operation, the signal source 180 may selectively direct photons from one laser into an individual core portion of the plurality of core portions $C_1$ and $C_2$. For example, the signal source 180, the input end 112 of the uncoupled-core multicore optical fiber 110, or both, may be coupled to a multicore fan-in device, which is configured to align the signal source 180 with any individual core portion of the plurality of core portions $C_1$ and $C_2$ (see FIG. 2).

FIG. 2 depicts a cross-sectional view of an embodiment of the uncoupled-core multicore optical fiber 110 along section II-II of FIG. 1. The uncoupled-core multicore optical fiber 110 includes a central fiber axis 12 (the centerline of the uncoupled-core multicore optical fiber 110, which defines radial position R=0) and a depressed index common cladding 19. The depressed index common cladding 19 can have an outer radius $R_{CC}$, which in the depicted embodiment of FIG. 2 corresponds to the outer radius of the uncoupled-core multicore optical fiber 110. A plurality of core portions $C_i$ (individually denoted $C_1$ and $C_2$ in the example of FIG. 2 and collectively referred to as core portions "C") are disposed within the depressed index common cladding 19, with each core portion $C_i$ generally extending through a length of the uncoupled-core multicore optical fiber 110 parallel to the central fiber axis 12. It should be understood that the arrangement of the core portions $C_1$ and $C_2$ within the common cladding 19 may vary. In some embodiments, the multicore fiber is comprised of two core portions that are uncoupled.

In some embodiments, $2*R_{CC}$ (e.g., the diameter of the multicore optical fiber 110) is equal to 125 microns. In embodiments, the diameter of the multicore optical fiber 110 is greater than 140 microns. In embodiments, the diameter of the multicore optical fiber 110 is greater than 170 microns. In embodiments, the diameter of the multicore optical fiber 110 is less than 200 microns. In embodiments, the diameter of the fiber is less than 160 microns. In embodiments, the diameter of the multicore optical fiber 110 is greater than or equal to 120 and less than or equal to 130 microns. In embodiments, the diameter of the multicore optical fiber 110 is greater than or equal to 120 and less than or equal to 150 microns. In embodiments, the diameter of the multicore optical fiber 110 is greater than or equal to 120 and less than or equal to 130 microns.

Each core portion $C_1$, and $C_2$, includes a central axis or centerline $CL_1$, and $CL_2$ (which define radial position r=0 for each core portion) and an outer radius $r_{C1}$, and $r_{C2}$. A position of each of the centerlines $CL_1$, and $CL_2$, within the uncoupled-core multicore optical fiber 110 can be defined using Cartesian coordinates with the central fiber axis 12 defining the origin (0,0) of an x-y coordinate system coincident with the coordinate system defined by the radial coordinate R. The position of centerline $CL_1$ can be defined as $(x_1,y_1)$, the position of centerline $CL_2$ can be defined as $(x_2,y_2)$. In embodiments, each of the core portions $C_i$ is separated from a nearest one (e.g., the core portion $C_j$ having a center line $CL_j$ that is closest to the centerline of that core portion) by a minimum core-to-core separation distance (or "minimum separation distance"). In embodiments, each of the core portions $C_i$ is separated from multiple core portions by the minimum separation distance. For example, as depicted in FIG. 2, the core portions $C_1$, and $C_2$ are arranged in a 1×2 arrangement. In such an arrangement, the centerlines $CL_1$ and $CL_2$ of the core portions $C_1$ and $C_2$ are separated by a minimum separation distance that can be defined as $D_{c1}-D_{c2}=\sqrt{[(x_2-x_1)^2+(y_2-y_1)^2]}$. As used herein, the term "adjacent core portion" is used to denote core portions having centerlines that are most proximate to one another (i.e., there is no other core portion $C_i$ having a centerline $CL_i$ that is more proximate to a core portion than an adjacent core portion). In embodiments, centerlines of adjacent core portions are separated by the minimum separation distance.

In embodiments, the minimum separation distance between the core portions $C_1$, and $C_2$ is greater than or equal to 45 microns and less than or equal to 60 microns. In embodiments, the minimum separation distance between the core portions $C_1$, and $C_2$ is greater than or equal to 48 microns and less than or equal to 60 microns. In embodiments, the minimum separation distance between the core portions $C_1$, and $C_2$ is greater than or equal to 50 microns and less than or equal to 55 microns.

In embodiments, edges of the plurality of core portions $C_i$ may also be spaced apart from the outer surface 116 of the uncoupled-core multicore optical fiber 110 by at least a minimum core edge to fiber edge distance $D_E$ as measured from the edge of each of the plurality of core portions $C_i$ to the outer surface 116. As depicted in FIG. 2, the minimum core edge to fiber edge distance $D_E$ is the minimum distance from a point along the outer circumference (e.g., a point on the outer circumference that is closest to the outer surface 116) of a core portion $C_i$ to a nearest point along the circumference of the outer surface 116, as determined by a line segment between the point along the outer circumference of the core portion $C_i$ and the nearest point along the circumference on the outer surface 15 in a plan perpendicular to the fiber axis 12. In embodiments, $D_E$ is greater than or equal to 15 microns. In embodiments, $D_E$ is greater than or equal to 20 microns. In embodiments, $D_E$ is greater than 25 microns. In embodiments, $D_E$ is less than 30 microns. Without intending to be bound by any particular theory, it is believed that the extent of signal loss due to tunneling is dependent upon the minimum value for $D_E$.

In embodiments, the uncoupled-core multicore optical fiber 110 can have a core portion $C_i$ positioned such that the core centerline $CL_i$ aligns with the central fiber axis 12. In embodiments, the uncoupled-core multicore optical fiber 110 can have a core portion $C_i$ pattern such that the cores $C_i$ are spaced around the central fiber axis 12.

Figure 3:
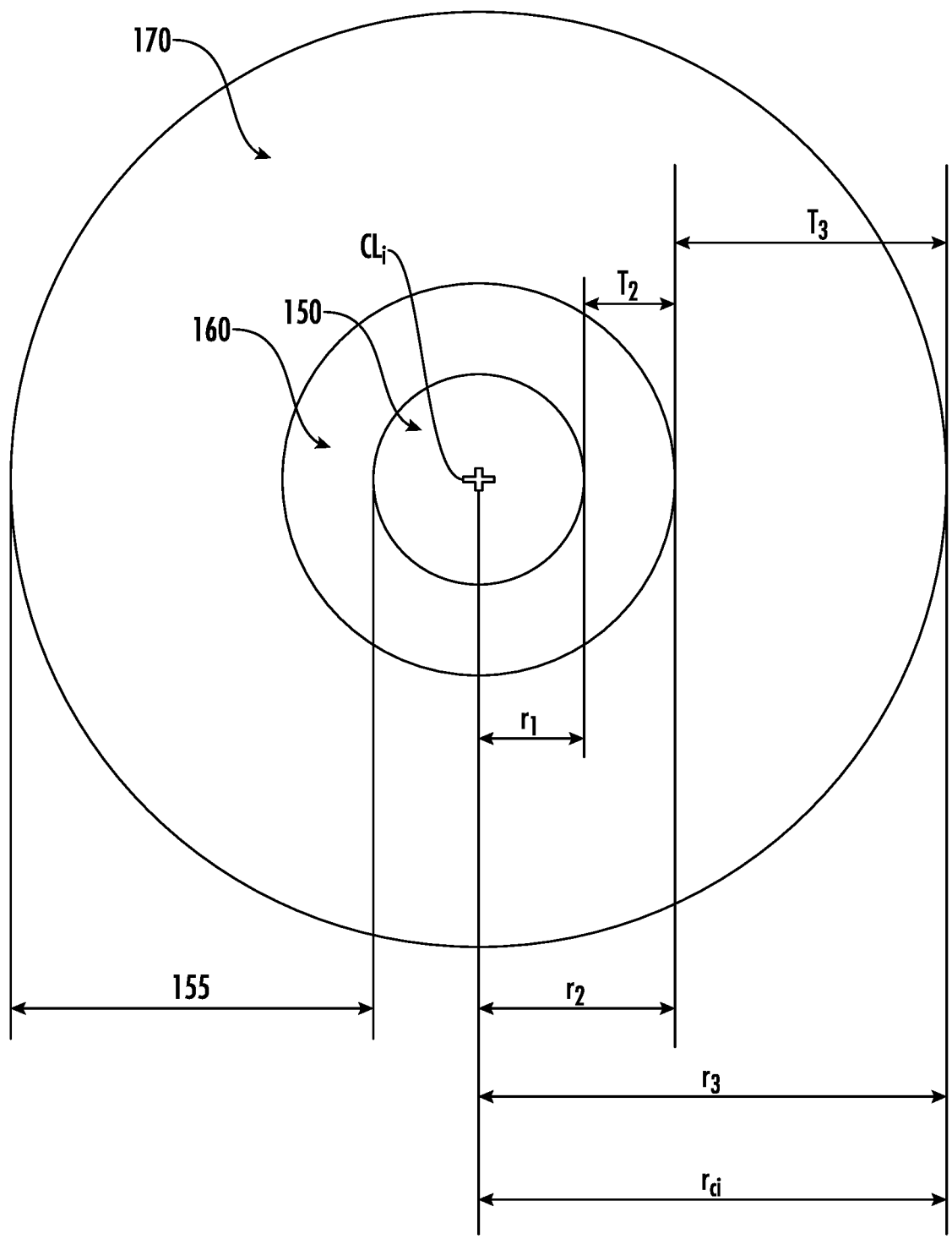
FIG. 3 schematically depicts a cross-section of a core portion of a multicore optical fiber comprising a core region, an inner cladding region, and a depressed cladding region, according to one or more embodiments described herein.

FIG. 3 schematically depicts a cross sectional view of one of the core portions $C_i$ described herein with respect to FIGS. 1-2 along the line V-V of FIG. 2. In embodiments, each of the core portions $C_i$ comprise a core region 150 centered on a centerline $CL_i$ and a cladding region 155. The cladding region 155 comprises an inner cladding region 160 (also referred to herein as an inner cladding layer) encircling and directly contacting the core region 150, a depressed cladding region 170 encircling and directly contacting the inner cladding region 160. In embodiments, the core region 150 and the cladding region 155 are concentric such that the cross section of the core portion $C_i$ is generally circular symmetric with respect to the centerline $CL_i$ having an overall radius $r_{Ci}$. The core region 150 has a radius $r_1$. The inner cladding region 160 has a radius $r_2$. The depressed cladding region 170 has a radius $r_3$ such that $r_3$ corresponds to the radius $r_{Ci}$ associated with each core portion $C_i$ described herein with respect to FIG. 2. The inner cladding region 160 extends between the radius $r_1$ of the core region 150 and an inner radius $r_2$ of the depressed cladding region 170 such that the inner cladding region 160 has a thickness $T_2=r_2-r_1$ in the radial direction. The depressed cladding region 170 has a thickness $T_3=r_3-r_2$ in the radial direction.

Figure 4:
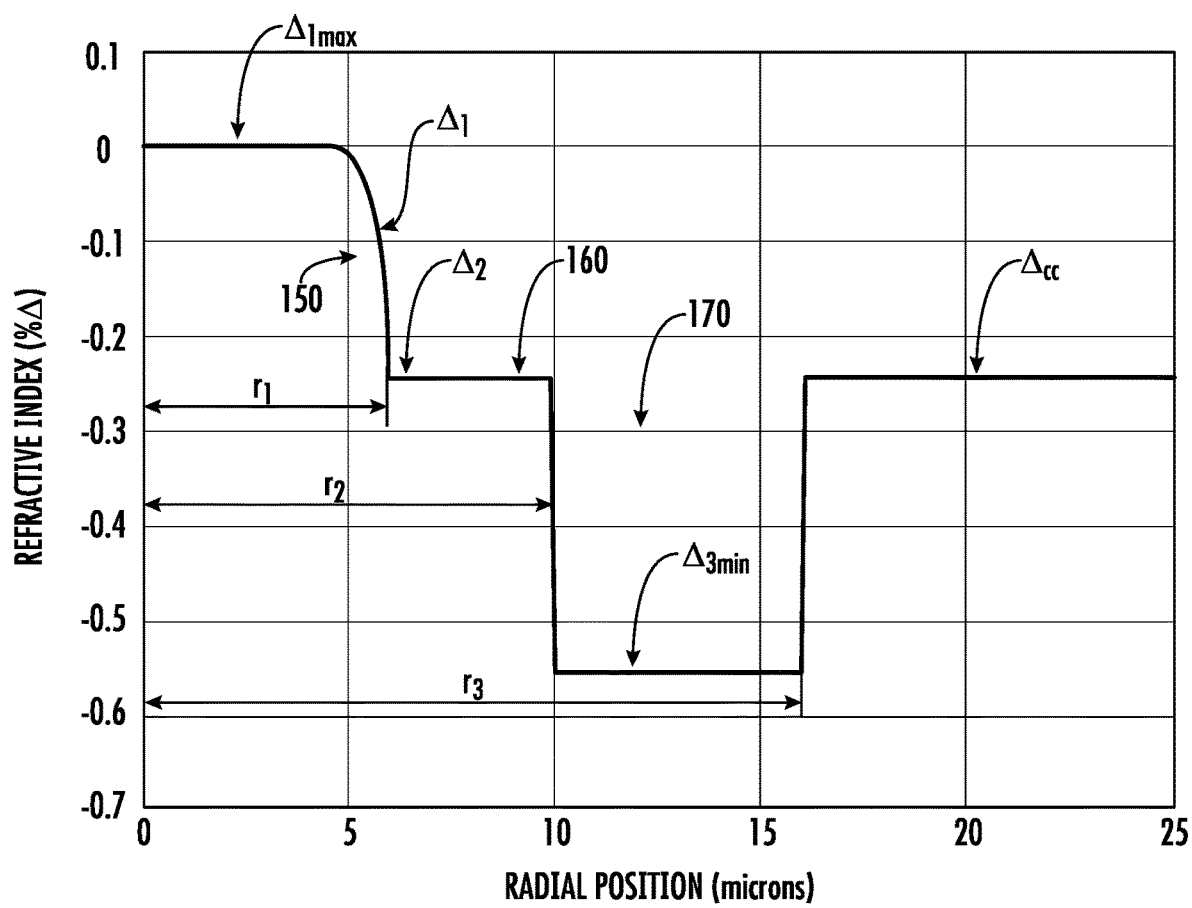
FIG. 4 graphically depicts a relative refractive index profile relative to pure silica of a core portion and common cladding, according to one or more embodiments described herein.
Figure 5:
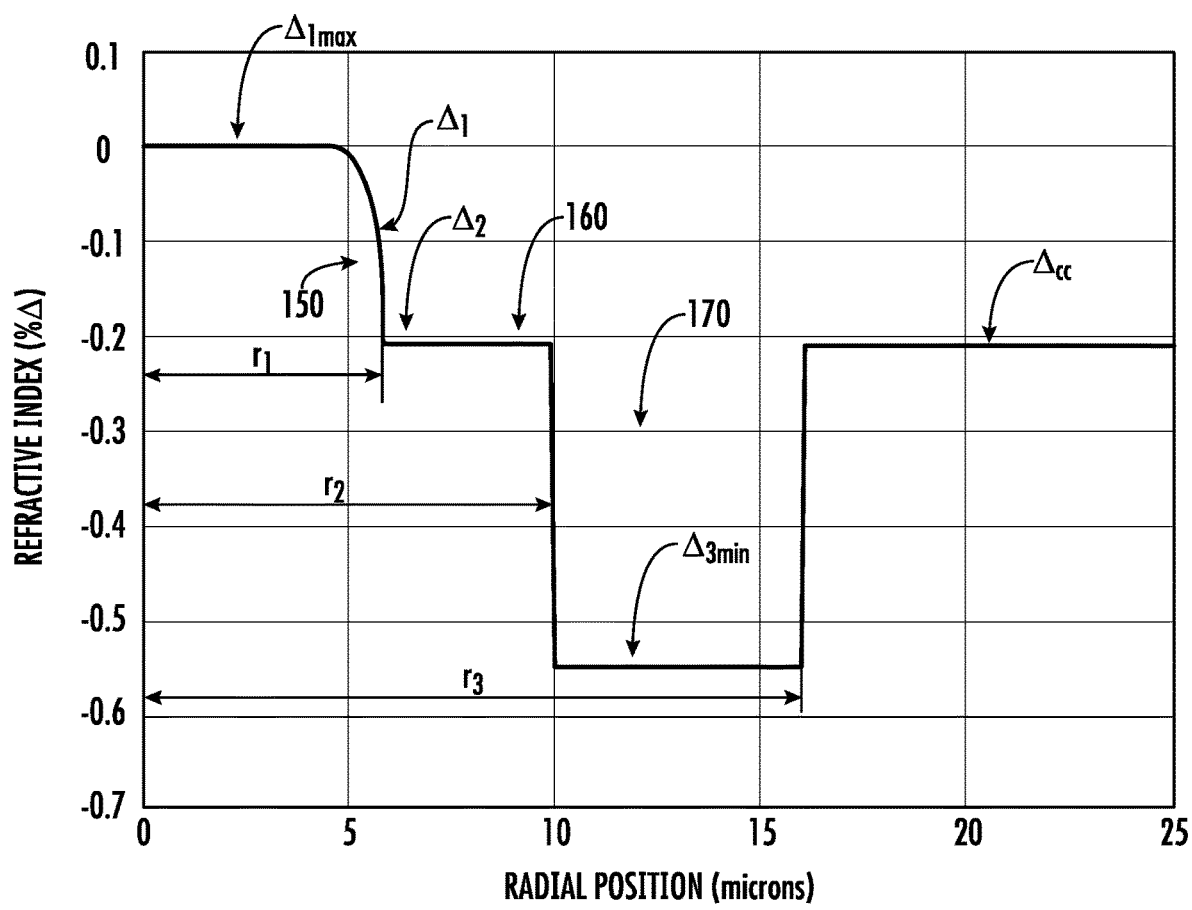
FIG. 5 graphically depicts a relative refractive index profile relative to pure silica of a core portion and common cladding, according to one or more embodiments described herein.

Referring to FIGS. 3, 4, and 5, a radial cross section of one embodiment of one of the core portions $C_i$ (FIG. 3) and corresponding exemplary relative refractive index profile (FIG. 4) of the core portion $C_i$ along the line VI in FIG. 2 are schematically depicted. In FIG. 4, the relative refractive index profile of the core portion $C_i$ is plotted as a function of radial distance r from the centerline $CL_i$ of the core portion $C_i$. As depicted in FIG. 2, the relative refractive index profile depicted in FIG. 4 and FIG. 5 extends radially outward from a centerline $CL_i$ of the core portion Ci and into a portion of the common cladding 19. As depicted in FIG. 4 and FIG. 5, the core region 150 has a relative refractive index $\Delta_1$. In embodiments, the relative refractive index $\Delta_1$ may vary with radial coordinate (radius) r and be represented as $\Delta_1(r)$. In embodiments, the core region 150 comprises silica-based glass having an up-dopant. In embodiments, the core region 150 comprises silica-based glass doped with at least one alkali. In embodiments, the core region 150 comprises silica-based glass doped with one or more alkali chosen from a group comprising sodium, potassium, rubidium or a combination thereof. In embodiments, the dopant consists of sodium, potassium, rubidium or a combination thereof. In embodiments, the dopant consists essentially of sodium, potassium, rubidium or a combination thereof. In embodiments, the core region 150 comprises silica-based glass doped with sodium and potassium. The average concentration in the light carrying region of the core portion is defined as:

$$C_{alkali,avg} = \frac{8\int_0^{MFD/2} C_{alkali}(r)rdr}{MFD}$$

where $C_{alkali}(r)$ is the concentration of the alkali as a function of radial distance from the center of the core portion and MFD is the mode field diameter of the core portion at the wavelength of interest (here considered as 1550 nm). In embodiments, the average concentration of alkali in the light carrying region of the core portion is in the range from 10 ppm to 500 ppm, or from 20 ppm to 500 ppm, or from 25 ppm to 400 ppm, or from 50 ppm to 300 ppm. Because core region 150 has a maximum average alkali concentration of 500 ppm, the alkali dopant only slightly increases the refractive index of core region 150. Therefore, core region 150 is still able to effectively achieve a refractive index of about 0% even with such alkali up-doping. When core region 150 includes two or more alkali dopants (such as both potassium and rubidium), the average concentration of alkali dopant is the sum of the average concentration of each of the individual alkali dopants. In some exemplary embodiments, the silica glass of core region 150 is free of germanium and/or chlorine; that is core region 150 comprises silica glass that lacks germanium and/or chlorine.

In embodiments, the relative refractive index $\Delta_1(r)$ of core region 150 includes a maximum relative refractive index $\Delta_{1max}$ (relative to pure silica). The maximum relative refractive index $\Delta_{1max}$ of core region 150 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_{1max}$ is about 0.0%. The relative refractive index $\Delta_{1max}$ is preferably constant or approximately constant.

In embodiments, the relative refractive index $\Delta_1(r)$ follows a graded index profile. The relative refractive index of each core region 150 is described by an α-profile with an α value that is in a range of about 7.0 or less, or about 6.0 or less, or about 5.0 or less, or about 4.0 or less, or about 3.0 or less, or about 2.0 or less, or about 1.0 or less. In some other embodiments, the α value is about 8.0 or greater, or about 9.0 or greater, or about 10.0 or greater, or about 11.0 or greater, or about 12.0 or greater, or about 13.0 or greater. In some embodiments, the core region a value is about 10, or about 12, or about 20. Therefore, core region 150 can have either a graded-index profile or a step-index profile. For example, in embodiments, the maximum relative refractive index $\Delta_{1max}$ may occur at r=0 (e.g., at the centerline $CL_i$) and decrease with an alpha profile until reaching a radius $r_1$. In embodiments, the relative refractive index $\Delta_1$ (r) follows a step index profile. For example, in embodiments, relative refractive index $\Delta_1$ (r) may remain substantially equal to the maximum relative refractive index $\Delta_{1max}$ until the radius $r_1$.

In embodiments, the radius $r_1$ of core region 150 coincides with an inner radius of inner cladding region 160. In embodiments, the core radius $r_1$ is greater than or equal to 3.0 microns and less than or equal to 7.0 microns. In embodiments, the core radius $r_1$ is greater than or equal to 3.5 microns and less than or equal to 6.5 microns (e.g., greater than or equal to 4.0 microns and less than or equal to 6.0 microns). Providing a core radius $r_1$ within this range facilitates each core portion $C_i$ having a mode field diameter at 1550 nm greater than or equal to 11 µm and less than or equal to 15 µm.

Referring still to FIGS. 3, 4, and 5 the inner cladding region 160 extends from radius $r_1$ to a radius $r_2$ such that the inner cladding has a radial thickness $T_2=r_2-r_1$. In embodiments, the inner cladding region 160 comprises a relative refractive index $\Delta_2$. In embodiments, the inner cladding region 160 is formed from silica-based glass. In some embodiments, the inner cladding region 160 comprises silica-based glass doped with down-dopants such that the relative refractive index $\Delta_2$ is less than 0. For example, inner cladding region 160 is down-doped with fluorine or boron.

Without wishing to be bound by theory, it is believed that the value of $r_2$ (and hence the radial thickness $T_2$ of the inner cladding region 160) in part determines the dispersion properties of each of the core portions $C_i$ and ability to achieve high mode field diameter with acceptable cutoff and bending properties. To achieve these optical properties, $r_2$ may be greater than or equal to 7 µm and less than or equal to 15 µm, or greater than or equal to 8 µm and less than or equal to 14 µm, or greater than or equal to 9 µm and less than or equal to 13 µm, or greater than or equal to 10 µm and less than or equal to 12 µm, or greater than or equal to 8 µm and less than or equal to 13 µm.

The relative refractive index $\Delta_2$ of inner cladding region 160 is in a range from about −0.20% to about −0.40%, or in a range from about −0.21% to about −0.38%, or in a range from about −0.22% to about −0.36%. In some embodiments, the relative refractive index $\Delta_2$ is about −0.25%, or about −0.26%, or about −0.31% or about −0.34% or about −0.35%. The relative refractive index $\Delta_2$ is preferably constant or approximately constant.

The depressed cladding region 170 extends from the radius $r_2$ to the radius $r_3$ such that the depressed cladding region has a radial thickness $T_3=r_3-r_2$. Without wishing to be bound by theory, it is believed that the value of $r_3$ (and hence the radial thickness $T_3$ of the depressed cladding region 170) in part determines bend loss of each of the core portions $C_i$ and inter-core cross talk between the cores. To achieve such optical properties, $r_3$ may be greater than or equal to 11 µm and less than or equal to 22 µm. In some embodiments, $r_3$ may be greater than or equal to 12 µm and less than or equal to 20 µm. In other embodiments, $r_3$ may be greater than or equal to 13 µm and less than or equal to 18 µm, or greater than or equal to 14 µm and less than or equal to 17 µm, or greater than or equal to 15 µm and less than or equal to 16 µm, or greater than or equal to 12 µm and less than or equal to 20 µm.

The depressed cladding region 170 has a relative refractive index $\Delta_3$. In embodiments, the relative refractive index $\Delta_3$ is less than or equal to the relative refractive index $\Delta_2$ of the inner cladding region 160 throughout the depressed cladding region 170. The relative refractive index $\Delta_3$ may also be less than or equal to the relative refractive index $\Delta_{CC}$ of the common cladding 19 (see FIG. 2) such that the depressed cladding region 170 forms a trench in the relative refractive index profile of the core portion $C_i$. The term "trench," as used herein, refers to a region of the core portion that is, in radial cross section, surrounded by regions of the multicore fiber (e.g., the inner cladding region 160 and the common cladding 19) having relatively higher refractive indexes. In embodiments, the relative refractive index $\Delta_3$ may be constant throughout the depressed cladding region 170. In other embodiments, the relative refractive index $\Delta_3$ may vary with radial coordinate r (radius) and be represented as $\Delta_3(r)$. In embodiments, the relative refractive index $\Delta_3(r)$ within the depressed cladding region 170 decreases monotonically with increasing radial distance from the centerline $CL_i$ such that the depressed cladding region 170 comprises a minimum relative refractive index $\Delta_{3min}$ at the $r_3$. In embodiments, $\Delta_3(r)$ decreases at a constant rate with radial distance from the centerline $CL_i$ such that the relative refractive index profile within the depressed cladding region 170 is substantially linear. In embodiments, the relative refractive index $\Delta_3(r)$ continuously decreases with increasing radial distance from the centerline $CL_I$ at an increasing or decreasing rate such that the relative refractive index profile within the depressed cladding region 170 has a parabolic or similar shape that is either concave or convex. Referring still to FIGS. 3-5, in embodiments $\Delta_1 > \Delta_2 > \Delta_{3min}$. In embodiments, $\Delta_2 \geq \Delta_3$ and $\Delta_{CC} \geq \Delta_3$ such that the depressed cladding region forms a depressed-index trench in a relative refractive index profile of each core portion between $r_2$ and $r_3$.

The relative refractive index $\Delta_{3min}$ of depressed cladding region 170 is in a range from about −0.40% to about −0.70%, or in a range from about −0.42% to about −0.65%, or in a range from about −0.45% to about −0.60%. In some embodiments, the relative refractive index $\Delta_{3min}$ is about −0.46%, or about −0.49%, or about −0.52% or about −0.55% or about −0.59%.

Figure 6:
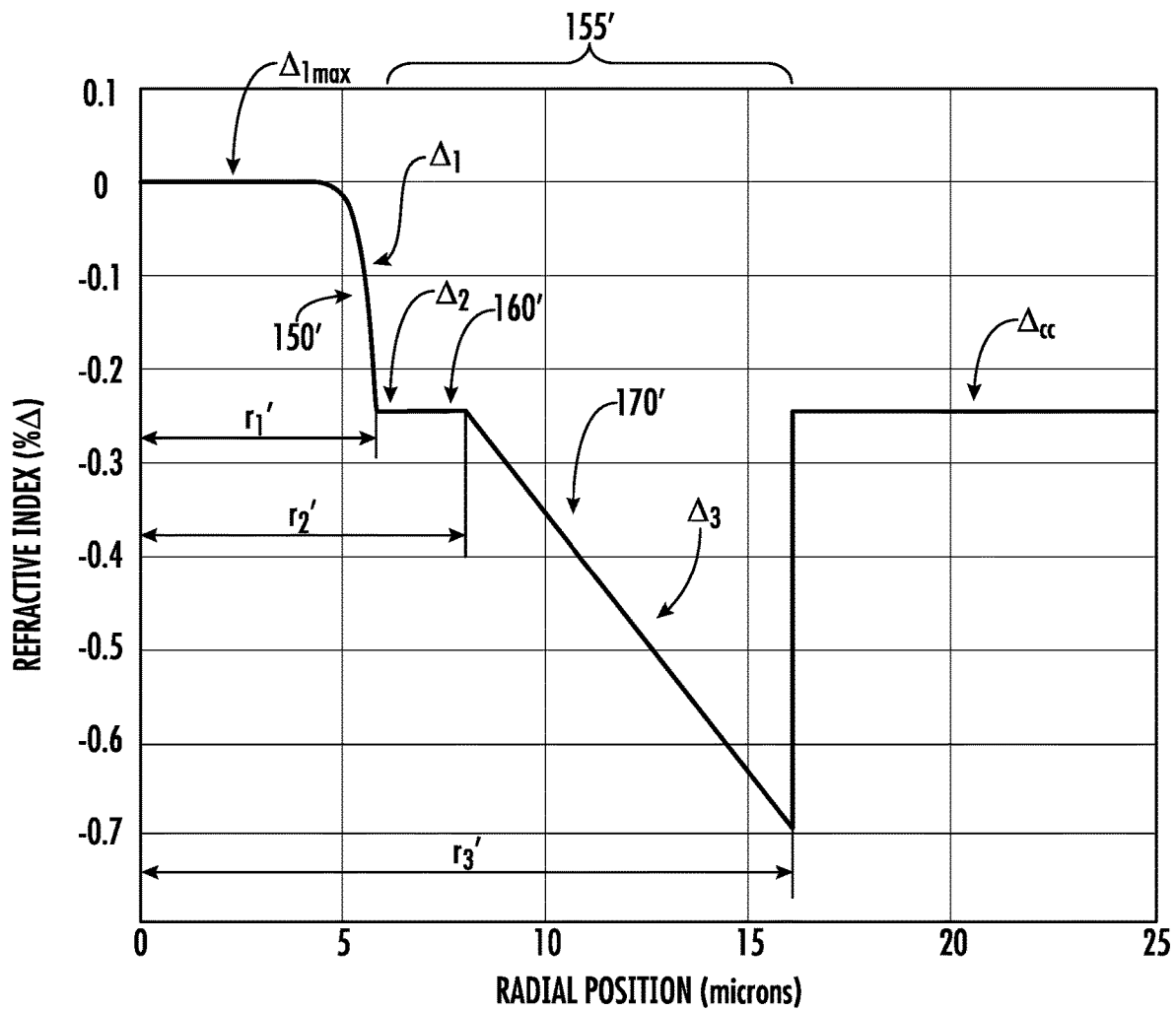
FIG. 6 graphically depicts a relative refractive index profile relative to pure silica of a core portion and common cladding, according to one or more embodiments described herein.

Referring still to FIGS. 3, 4, and 5, in embodiments, the depressed cladding region 170 comprises silica glass having one or more down-dopants (e.g., fluorine). In embodiments, the down-dopant concentration within the depressed cladding region 170 varies as a function of radial distance from the centerline $CL_i$ of the core portion $C_i$. For example, in embodiments, the down-dopant concentration varies within the depressed cladding region 170 by increasing monotonically from, for example, a minimum value 0.6 wt % fluorine to 1.2 wt % fluorine at the radial position $r_2$ to a maximum value at the radial position $r_3$. In embodiments, the maximum value of the down-dopant concentration is greater than or equal to 1.2 wt. % and less than or equal to 2.2 wt. %. In embodiments, the maximum fluorine concentration $F_{max}$ is greater than or equal to 1.5 wt. % and less than or equal to 2.0 wt. %. In accordance with the down-dopant concentration within the depressed cladding region 170, the relative refractive index $\Delta_3(r)$ may decrease monotonically with increasing radial distance from the centerline $CL_i$ of the core portion $C_i$ such that the depressed cladding region 170 forms a triangular-shaped trench in the refractive index profile as depicted in FIG. 6. In embodiments, $\Delta_{3min}$ is less than or equal −0.5% $\Delta$ and greater than or equal to −0.7% $\Delta$.

The radial thickness of a particular glass portion of a core portion $C_i$ may be interrelated with a relative refractive index of the particular glass portion. Specifically, a glass portion 'i' with a relative refractive index $\Delta_i\%$, an inner radius $r_{in}$ and an outer radius $r_{out}$ may have a trench volume $V_i$ defined as:

$$V_i = 2 \int_{r_{in}}^{r_{out}} [\Delta_i\% - \Delta_{CC}\%](R)RdR \quad (11)$$

which may be rewritten as:

$$V_i = [\Delta_i\% - \Delta_{CC}\%](r_{out}^2 - r_{in}^2) \quad (12)$$

Accordingly, the depressed cladding region 170 may have a trench volume $V_T$ of:

$$V_T = [\Delta_i\% - \Delta_{CC}\%](r_3^2 - r_2^2) \quad (13)$$

In embodiments, the depressed cladding region 170 is constructed to have a down-dopant concentration to achieve a trench volume $V_T$ within each core portion $C_i$ that is greater than or equal to 20% $\Delta\mu m^2$ and less than 60% $\Delta\mu m^2$. In some embodiments, the trench volume $V_T$ within each portion $C_i$ that is greater than 25% $\Delta\mu m^2$ and less than 55% $\Delta\mu m^2$, or greater than or equal to 30 $\Delta\mu m^2$ and less than or equal to 55 $\Delta\mu m^2$, or greater than or equal to 35 $\Delta\mu m^2$ and less than or equal to 50 $\Delta\mu m^2$, or greater than or equal to 40 $\Delta\mu m^2$ and less than or equal to 45 $\Delta\mu m^2$, or greater than or equal to 30 $\Delta\mu m^2$ and less than or equal to 40 $\Delta\mu m^2$. Without wishing to be bound by theory, it is believed that the trench volume $V_T$ within the depressed cladding region 170 is determinative of the cable cutoff and the mode field diameter of each core portion $C_i$. Providing a trench volume $V_T$ with the values disclosed herein produces core portions $C_i$ with cable cutoff values of less than 1530 nm. In some embodiments, each core portions $C_i$ have a cable cutoff of less than 1450 nm. In some embodiments, each core portion $C_i$ has an effective area of greater than 100 $\mu m^2$ at 1550 nm and less than 135 $\mu m^2$ at 1550 nm. In other embodiments, each core portion $C_i$ has an effective area of greater than 110 $\mu m^2$ at 1550 nm and less than 130 $\mu m^2$ at 1550 nm.

Referring still to FIGS. 3, 4, and 5, the outer common cladding region 172 extends from radius $r_3$ to a radius $R_{CC}$ such that the inner cladding has a radial thickness $T_{CC}=R_{CC}-r_3$. Without wishing to be bound by theory, it is believed that the value of $R_{CC}$ (and hence the radial thickness $T_4$ of the outer common cladding region 172) in part determines the tunneling or radiation loss of each of the core portions $C_i$. To achieve acceptable loss in each core portion, $T_4$ may be greater than or equal to 10 $\mu m$ and less than or equal to 25 $\mu m$. In embodiments, the outer cladding region 172 comprises a relative refractive index $\Delta_{CC}$.

FIG. 6 schematically depicts another relative refractive index profile for the core portions $C_i$ of the multicore optical fiber 110 described herein with respect to FIGS. 1-2. In embodiments, the core portion relative refractive index profile depicted in FIG. 6 also extends along the line VI shown in FIG. 2 from the centerline $CL_i$ of the core portion $C_i$ into the common cladding 19. The core portions $C_i$ may include similar structural components as described with respect to FIGS. 3, 4, and 5. As such, in embodiments in accordance with FIG. 6 each of the core portions $C_i$ comprise a core region 150' and a cladding region 155'. The cladding region 155' comprises an inner cladding region 160' encircling and directly contacting the core region 150' and a triangular shaped depressed cladding region 170' encircling and directly contacting the inner cladding region 160' and an outer cladding region 172' encircling and directly contacting the depressed cladding region 170'. The core region 150' has a radius $r_{1'}$ and the depressed cladding region 170' has a radius $r_{3'}$ and the outer cladding region 172' has a radius $r_4$ that defines an outer radius of the core portion $C_i$ such that $r_{4'}$ corresponds to the radius $r_{Ci}$ associated with each core portion $C_i$ described herein with respect to FIG. 2. The inner cladding region 160' extends between the radius $r_{1'}$ of the core region 150' and an inner radius $r_{2'}$ of the depressed cladding region 170' such that the inner cladding region 160 has a thickness $T_{2'}=r_{2'}-r_{1'}$ in the radial direction. The depressed cladding region 170' has a thickness $T_{3'}=r_{3'}-r_{2'}$ in the radial direction.

Each of the core region 150', the inner cladding region 160', the depressed cladding region 170' and the outer cladding region 172' may have structural and compositional properties that are generally similar to those described herein with respect to the core region 150, the inner cladding region 160, the depressed cladding region 170 and outer cladding region 172 described herein with respect to FIGS. 3, 4, and 5. The minimum relative refractive index $\Delta_{3min'}$ of the depressed cladding region 170' depicted in FIG. 6 is less than the minimum relative refractive index $\Delta_{3min}$ of the depressed cladding region 170 described herein with respect to FIGS. 4-5. The performance of the relative refractive profiles depicted in FIGS. 4, 5 and 6, as well as specific values associated therewith, are described in greater detail in the Examples section contained herein.

In the embodiments disclosed herein, the co-propagating cross talk at a wavelength of 1550 nm between each core portion $C_i$ and an adjacent core portion $C_j$ is less than or equal to about −30 dB/100 km, or less than about −35 dB, or less than about −40 dB per 100 km length of fiber and for a bend diameter of 140 mm. In embodiments, the co-propagating cross talk between adjacent cores at a wavelength of 1550 nm is less than about −45 dB, or less than about −50 dB, or less than about −60 dB, or less than about −65 dB, or less than about −70 dB, or less than about −75 dB, per 100 km length of fiber and for a bend diameter of 140 mm. Additionally or alternatively, in some embodiments, the co-propagating cross talk between adjacent cores at a wavelength of 1550 nm is greater than about −80 dB, or greater than about −75 dB, or greater than about −70 dB, or greater than about −65 dB, or greater than about −60 dB per 100 km length of fiber and for a bend diameter of 140 mm. In embodiments, the cross-talk is determined in accordance with equations 5-8 herein.

The counter-propagating cross talk between adjacent cores in the optical fibers produced herein at a wavelength of 1550 nm is less than about −70 dB, or less than about −69 dB, or less than about −68 dB, or less than about −67 dB, or less than about −66 dB, or less than about −65 dB, or less than about −64 dB, or less than about −63 dB, or less than about −63 dB, or less than about −62 dB, or less than about −61 dB, or less than about −60 dB, or less than about −55 dB, or less than about −53 dB, or less than about −50 dB, or less than about −47 dB, or less than about −45 dB, or less than about −43 dB, or less than about −40 dB, or less than about −37 dB, or less than about −35 dB, or less than about −33 dB, or less than about −30 dB per 100 km length of fiber and for a bend diameter of 140 mm. Additionally or alternatively, in some embodiments, the counter-propagating cross talk between adjacent cores at a wavelength of 1550 nm is greater than about −100 dB, or greater than about −95 dB, or greater than about −90 dB, or greater than about −85 dB, or greater than about −80 dB per 100 km length of fiber and for a bend diameter of 140 mm.

In embodiments, each core portion $C_i$ of the uncoupled-core multicore optical fiber 110 may have an effective area $A_{eff}$ at 1550 nm wavelength of about 100 micron$^2$ or greater, or about 105 micron$^2$ or greater, or about 110 micron$^2$ or greater, or about 115 micron$^2$ or greater, or about 120 micron$^2$ or greater, or about 125 micron$^2$ or greater, or about 130 micron$^2$ or greater. Additionally or alternatively, the optical fibers have an effective area, at 1550 nm wavelength, of about 135 micron$^2$ or less, or about 130 micron$^2$ or less, or about 125 micron$^2$ or less, or about 120 micron$^2$ or less, or about 115 micron$^2$ or less. In embodiments, the effective area is about 100 micron$^2$ to about 135 micron$^2$, or about 105 micron$^2$ to about 130 micron$^2$, or about 110 micron$^2$ to about 125 micron$^2$, or about 115 micron$^2$ to about 120 micron$^2$. In some exemplary embodiments, the effective area is about 110 micron$^2$, or about 111 micron$^2$, or about 112 micron$^2$, or about 114 micron$^2$. The effective area is determined individually for each core portion $C_i$ of the uncoupled-core multicore optical fiber 110 without consideration of the effects of crosstalk between the core portions $C_i$ of the uncoupled-core multicore optical fiber 110.

The average attenuation of the uncoupled-core multicore optical fiber 110 is determined by measuring the attenuation for each core portion $C_i$ of the uncoupled-core multicore optical fiber 110 at a wavelength of 1310 nm or 1550 nm and then calculating an average attenuation for the entire uncoupled-core multicore optical fiber 110 based on the individual attenuation measurements of each core portion $C_i$. In embodiments, the average attenuation at 1550 nm of the uncoupled-core multicore optical fiber 110 is less than 0.16 dB/km. In some embodiments, the average attenuation at 1550 nm of the uncoupled-core multicore optical fiber 110 is less than 0.155 dB/km. In other embodiments, the average attenuation at 1550 nm of the uncoupled-core multicore optical fiber 110 is less than 0.15 dB/km. In some embodiments, the average attenuation at 1550 nm of the uncoupled-core multicore optical fiber 110 is greater than 0.13 dB/km. It should be understood that the attenuation of the uncoupled-core multicore optical fiber 110 may be within a range formed from any one of the lower bounds for attenuation and any one of the upper bounds of attenuation described herein.

The individual attenuation of each core region 150 is also determined, which is about less than about 0.165 dB/km, or less than about 0.160 dB/km, or less than about 0.155 dB/km, or less than about 0.150 dB/km, or less than about 0.149 dB/km, or less than about 0.145 dB/km, or less than about 0.140 dB/km, or less than about 0.135 dB/km, or less than about 0.130 dB/km, at a wavelength of 1550 nm. In embodiments, the attenuation of a first core region 150 in the uncoupled-core multicore optical fibers disclosed herein is about 0.148 dB/km and the attenuation of a second region 150 in uncoupled-core multicore optical fibers disclosed herein is about 0.147 dB/km In various embodiments, the cable cutoff of each core portion $C_i$ of the uncoupled-core multicore optical fiber 110 is greater than or equal to 1300 nm and less than or equal to 1530 nm to allow for single-mode operation at 1550 nm. In some embodiments, the cable cutoff of each core portion $C_i$ is between 1350 nm and 1500 nm, or between 1400 nm and 1450 nm. It should be understood that the cable cutoff of each core portion $C_i$ of the uncoupled-core multicore optical fiber 110 may be within a range formed from any one of the lower bounds for cable cutoff and any one of the upper bounds of cable cutoff described herein. As discussed above, the cable cutoff of the fibers disclosed herein is preferably high in order to improve the bend performance of the fibers. It is also noted that the effective area of the fibers is relatively high (as discussed above), thus contributing to the higher cable cutoff.

In various embodiments, dispersion at 1550 nm of each core portion $C_i$ of the uncoupled-core multicore optical fiber 110 is greater than or equal to 19 ps/nm/km and less than or equal to 22 ps/nm/km. It should be understood that the dispersion at 1550 nm of each core portion $C_i$ of the uncoupled-core multicore optical fiber 110 may be within a range formed from any one of the lower bounds for dispersion at 1550 nm and any one of the upper bounds of dispersion at 1550 nm described herein.

In addition to the properties disclosed above, each core region 150 disclosed herein has a mode field diameter, at 1550 nm wavelength, of about 11.0 microns or greater, or about 11.5 microns or greater, or about 12.0 microns or greater, or about 12.5 microns or greater, or about 13.0 microns or greater, or about 13.5 microns or greater, or about 14.0 microns or greater, or about 14.5 microns or greater, or about 15.0 microns or greater. Additionally or alternatively, each core region 150 has a mode field diameter, at 1550 nm wavelength, of about 15.0 microns or less, or about 14.5 microns or less, or about 14.0 microns or less, or about 13.5 microns or less, or about 13.0 microns or less, or about 12.5 microns or less, or about 12.0 microns or less, or about 11.5 microns or less. In some embodiments, each core region 150 has a mode field diameter, at 1550 nm wavelength, from about 11.0 microns to about 15.0 microns, or about 11.5 microns to about 14.5 microns, or about 12.0 microns to about 14.0 microns, or about 12.5 microns to about 13.5 microns. In exemplary embodiments, the mode field diameter is about 11.5 microns, or about 12.0 microns, or about 12.5 microns, or about 13.0 microns.

Referring again to FIG. 3, in embodiments, each core portion $C_i$ is fabricated such that the varying relative refractive index $\Delta_3$ of the depressed cladding region 170 is determined by a down-dopant concentration D that varies with radial coordinate r, i.e., D=D(r). In embodiments, the down-dopant is fluorine and D(r) is expressed as a radially-dependent fluorine concentration F(r). As such, F(r) within the depressed cladding region 170 may vary between a minimum value $F_{min}$ and a maximum value $F_{max}$. In embodiments, $F_{min}$ is at the radial position $r_2$ and $F_{max}$ is at the radial position $r_3$. In embodiments, $F_{max}$ is greater than or equal to 1.2 wt. % and less than or equal to 2.2 wt. %. In embodiments, $F_{max}$ is greater than or equal to 1.5 wt. % and less than or equal to 2.2 wt. %.

The values of the down-dopant concentrations (e.g., $F_{max}$ and $F_{min}$) within the depressed cladding region 170 determine the refractive index profile therein, and therefore the trench volume $V_T$ of the depressed cladding regions 170 and 170' in FIGS. 3-6. Without wishing to be bound by theory, it is believed that the trench volume determines a cable cutoff, effective area, dispersion, bend loss and inter-core cross-talk of each of the core portions $C_i$. For example, to achieve effective area of between 100 μm$^2$ and 135 μm$^2$, cable cutoff of less than 1530 nm, dispersion at 1550 nm of less than 22 ps/nm/km and cross-talk less than −30 dB/100 km, the trench volume within the depressed cladding region 170 of each core portion $C_i$ may be greater than or equal to 20% Δ μm² and less than or equal to 60% Δ μm².

Exemplary Process

The uncoupled-core multicore optical fibers of the present disclosure can be made using any suitable method for forming a multicore optical fiber. See, for example, U.S. Pat. No. 11,370,689 B2, the entire content of which is incorporated herein by reference. An exemplary method that is used to form the uncoupled-core multicore optical fiber 110 (or any of the alternative embodiments thereof) described herein with respect to FIGS. 1-9B includes forming a glass blank for common cladding 19. Formation of the glass blank may involve first forming a soot body via an outside vapor deposition ("OVD") process, a soot pressing method, a vapor axial deposition ("VAD") process, or any other known method and then dehydrated and consolidated to fully densified glass. The soot body may be formed of a glass precursor material. In embodiments, the soot body is formed of silica-based material. Multiple holes are then drilled along the length of the glass blanks for the core canes to be inserted in them. In some embodiments, the common cladding glass blank is doped with a down dopant such as fluorine.

Next, a core region of a core cane may be formed. In some embodiments, the core region is comprised of at least one alkali in concentration between 0.1 wt % and 5 wt %. In some embodiments, the core is doped with potassium. In other embodiments, the core is doped with two alkali components selected from the group comprising potassium, sodium, rubidium, and cesium. The core cane may be formed by methods disclosed in U.S. Pat. No. 7,536,076 B2, the entire content of which is incorporated herein by reference.

Next, a clad layer is deposited on the core region. In embodiments, soot overclad layer(s) of silica-based soot is formed on the core region via an OVD or VAD process. The overclad layer(s) has a composition corresponding to the depressed-index cladding of the core portion of the multicore optical fiber. For example, the overlayers may include separate layers having a composition corresponding to depressed cladding region 170. The overcladded core region is positioned within a consolidation furnace and consolidation of the overcladded core region is initiated. For example, the overcladded core region may be heated to a peak sintering temperature to initiate consolidation.

During the consolidation, the overcladded core region is exposed to a down-dopant for a period T after initiation of the consolidation. A soot preform resulting from the completion of the consolidation process includes a core region and an overcladding layer surrounding the core region. The core region (e.g., in an unconsolidated or partially consolidated state) and overcladding layer may be placed in an interior of a consolidation furnace. The consolidation furnace may be heated to a peak sintering temperature of the overcladding layer to initiate consolidation.

A gas source is in fluid communication with the interior of the consolidation furnace provides a gas containing a down-dopant into the interior. The down-dopant (e.g., fluorine) then diffuses through the overcladding layer during consolidation. In embodiments, the rate of diffusion of the down-dopant through the overcladding layer is dependent on the compositional and material properties of the overcladding layer (e.g., porosity, density, etc.). As the overcladding layer is consolidated, the porosity of the overcladding layer is diminished such that a rate of diffusion of the down-dopant may decrease as the overcladding layer consolidates.

In embodiments, a region of the core portion encircling and directly contacting the core corresponds to the depressed cladding region 170. In embodiments, depressed cladding region 170 possess a concentration of the down-dopant.

After the core region is consolidated into a glass preform, the glass preform is inserted into the holes drilled into the glass blank formed during the step. After each core cane is inserted into the glass blank, the fiber preform is assembled by thermally closing the gap between the inserted cane and the drilled hole. The assembled preform is then drawn into a multicore optical fiber. Example methods of forming a cane-based optical fiber preform are discussed in U.S. Pat. No. 11,370,689, the entire content of which is incorporated by reference herein.

EXAMPLES

The embodiments described herein will be further clarified by the following examples.

Triangular Trench Examples

A multicore fiber design was mathematically modeled to determine the optical properties of the fibers. In embodiments, each core region is alkali doped having alkali average concentration in the light carrying region of each of the core portion of about 100 ppm In embodiments, each of the core portions also included an inner cladding and a depressed cladding trench region down-doped with fluorine. The depressed cladding trench region may comprise a maximum fluorine concentration that is greater than or equal to 1.2 wt. % and less than or equal to 2.2 wt. %. Each core portion in both the multicore optical fibers were modeled with the structure depicted in FIG. 6. That is, each of the core portions in Examples A were modeled to include a core region 150', an inner cladding region 160' encircling and in direct contact with the core region 150', a depressed cladding region 170' encircling and in direct contact with the inner cladding region 160' and defining a trench in the relative refractive index profiles of the core portions and an outer cladding region 172 encircling and directly contacting the depressed cladding region 170'. Each multicore optical fiber in Examples A has an outer common cladding constructed of undoped silica-based glass having a radius $R_{CC}$=62.5 μm. Each core portion $C_i$ in Example A possessed the relative refractive index profile depicted in FIG. 6. The structure and optical properties of the optical fibers of Example A is set forth in Table 1.

TABLE 1

| Example A | |
| --- | --- |
| Parameter | Example A |
| Multicore Design | 1 × 2 |
| Core Index, % Δ1 | 0 |
| Core Radius, R1, microns | 5.75 |
| Core Alpha | 20 |
| Inner Cladding Index, % Δ2 | −0.245 |
| Inner Cladding Radius, R2, microns | 8 |
| Trench Index, % Δ3 | −0.695 |
| Trench Radius, R3, microns | 16 |
| Trench Shape | Triangular |
| Common Cladding Index, % Δc | −0.245 |

TABLE 1-continued

| Example A | |
|---|---|
| Parameter | Example A |
| Trench Volume, % Δ micron2 | 48 |
| Cable Cutoff, nm | 1419 |
| MFD at 1550, microns | 11.9 |
| Effective Area, Aeff, at 1550 nm (microns^2) | 112.96 |
| Dispersion at 1550 nm (ps/nm/km) | 21.3 |

The core-portions of the optical fiber of Example A have a co-propagating cross talk of less than or equal to −40 dB with adjacent core portions. To achieve cross talk values in such ranges, the core portions of the optical fiber of Example A were separated from one another by a separation distance greater than or equal to 45 μm and less than or equal to 60 μm.

Rectangular Trench Examples

In additional examples, another two multicore fiber designs having two different core portion designs (Example B having a relative refractive index profile depicted in FIG. 4 and Example C having a relative refractive index profile depicted in FIG. 5) were mathematically modeled to determine the optical properties of the fibers. In embodiments, each core region is alkali doped having alkali average concentration in the light carrying region of each of the core portion of about 100 ppm. In embodiments, each of the core portions also included an inner cladding region and a depressed cladding trench region down-doped with fluorine. The depressed cladding regions may comprise a maximum fluorine concentration that is greater than or equal to 1.1 wt. % and less than or equal to 2.2 wt. %. Each core portion in both the multicore optical fibers were modeled with the structure depicted in FIG. 3. That is, each of the core portions in Examples B and C were modeled to include a core region 150, an inner cladding region 160 encircling and in direct contact with the core region 150, a depressed cladding region 170 encircling and in direct contact with the inner cladding region 160 and defining a trench in the relative refractive index profiles of the core portions and a common cladding region 19 encircling and directly contacting the depressed cladding region 170. Each multicore optical fiber in Examples B and C has a fluorine doped outer common cladding having a radius $R_{CC}$=62.5 μm. Examples B and C differ from the Example A described herein in that the Examples B and C include depressed cladding regions 170 with a rectangular trench profile. That is, the relative refractive index $\Delta_3$ remains substantially constant within the depressed cladding regions 170 of examples B and C at the minimum relative refractive index $\Delta_{3min}$. In embodiments, the depressed cladding regions 170 define a trench having a trench volume $V_T$ greater than or equal to 20% Δ μm² and less than or equal to 60% Δ μm².

Each core portion $C_i$ in Example B possessed the relative refractive index profile depicted in FIG. 4. Each core portion $C_i$ in Example C possessed the relative refractive index profile depicted in FIG. 5.

TABLE 2

| Examples B and C | | |
|---|---|---|
| Parameter | Example B | Example C |
| Multicore Design | 1 × 2 | 1 × 2 |
| Core Index, % Δ1 | 0 | 0 |
| Core Radius, R1, microns | 5.75 | 5.85 |
| Core Alpha | 20 | 20 |
| Inner Cladding Index, % Δ2 | −0.245 | −0.21 |
| Inner Cladding Radius, R2, microns | 10 | 10 |
| Trench Index, % Δ3 | −0.555 | −0.55 |
| Trench Radius, R3, microns | 16 | 16 |
| Trench Shape | Rectangular | Rectangular |
| Common Cladding Index, % Δc | −0.245 | −0.21 |
| Trench Volume, % Δ micron2 | 48 | 53 |
| Cable Cutoff, nm | 1423 | 1352 |
| MFD at 1550, microns | 11.91 | 12.36 |
| Effective Area, Aeff, at 1550 nm (microns^2) | 113.36 | 122.28 |
| Dispersion at 1550 nm (ps/nm/km) | 21.2 | 21.61 |

| Center-to-Center Spacing Between Centerline of Adjacent Core Portions (microns) | Co-Propagating Crosstalk at 1550 nm per 100 km Length of Fiber (dB) at Bend Diameter of 140 mm | |
|---|---|---|
| 44 | −37.73 | −30.29 |
| 46 | −43.24 | −35.24 |
| 48 | −48.73 | −40.18 |
| 50 | −54.22 | −45.18 |
| 52 | −59.69 | −50.02 |
| 54 | −65.15 | −54.92 |
| 56 | −70.59 | −59.81 |
| 58 | −76.03 | −64.68 |
| 60 | −81.46 | −69.55 |

| Center-to-Center Spacing Between Centerline of Adjacent Core Portions (microns) | Counter-Propagating Crosstalk at 1550 nm per 100 km Length of Fiber (dB) at Bend Diameter of 140 mm | |
|---|---|---|
| 44 | −60.8 | −53.39 |
| 46 | −66.36 | −58.63 |
| 48 | −71.87 | −63.67 |
| 50 | −77.36 | −68.7 |
| 52 | −82.39 | −73.55 |
| 54 | −88.29 | −78.46 |
| 56 | −93.73 | −83.35 |
| 58 | −99.17 | −88.22 |
| 60 | −104.6 | −93.09 |

Figure 7A:
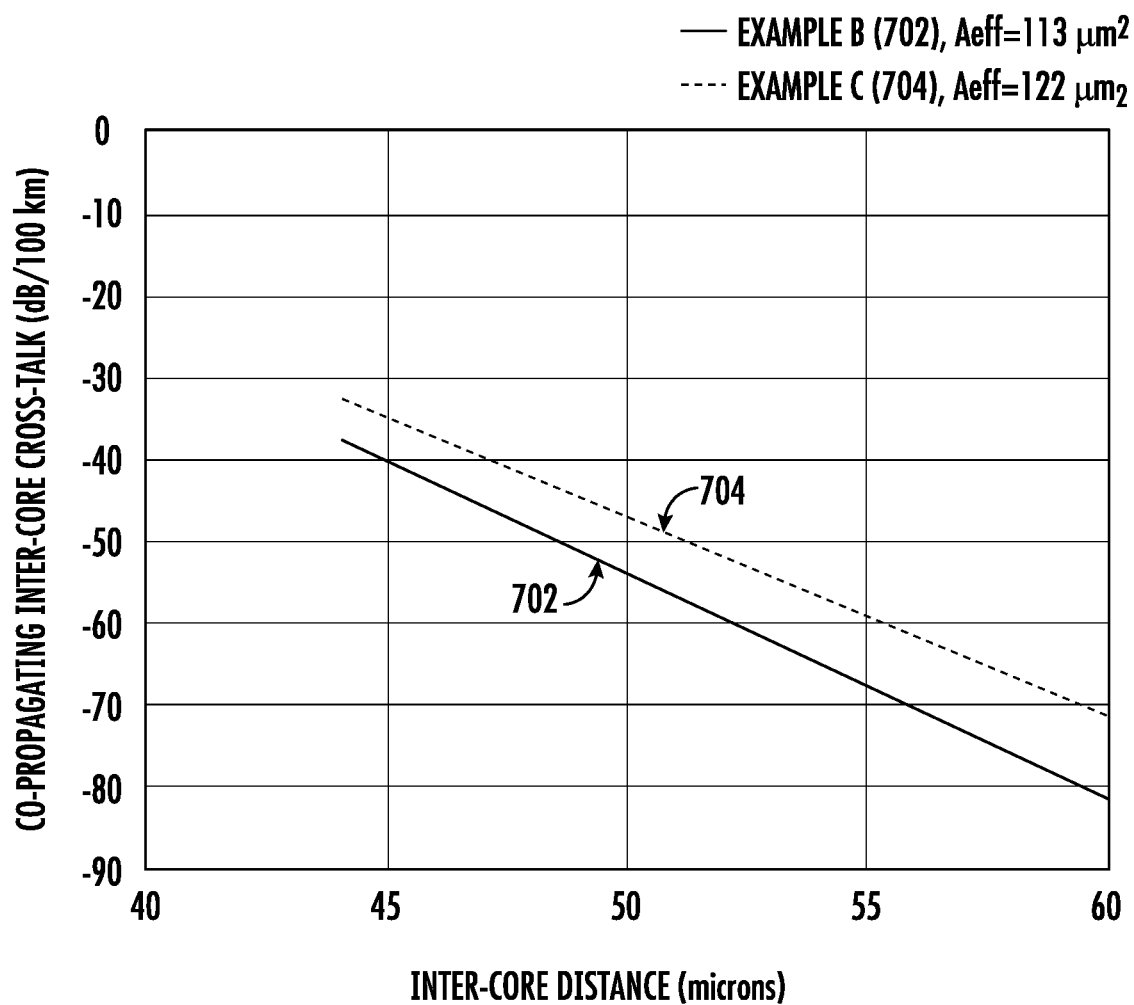
FIG. 7A depicts the co-propagating inter-core cross-talk as a function of inter-core distance for two exemplary multicore optical fibers, according to one or more embodiments described herein.
Figure 7B:
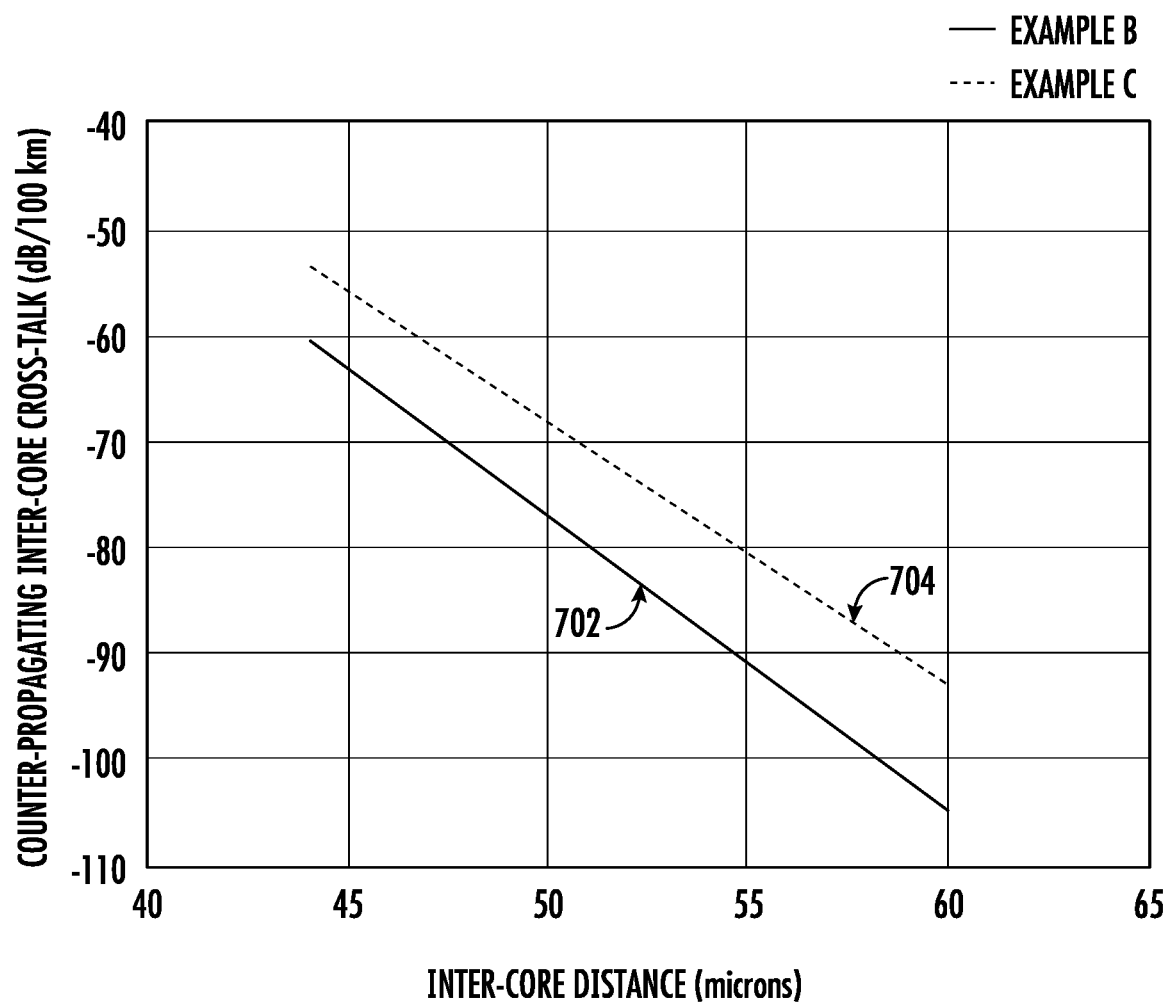
FIG. 7B depicts the counter-propagating inter-core cross-talk as a function of inter-core distance for the two exemplary multicore optical fibers, according to one or more embodiments described herein.
Figure 8:
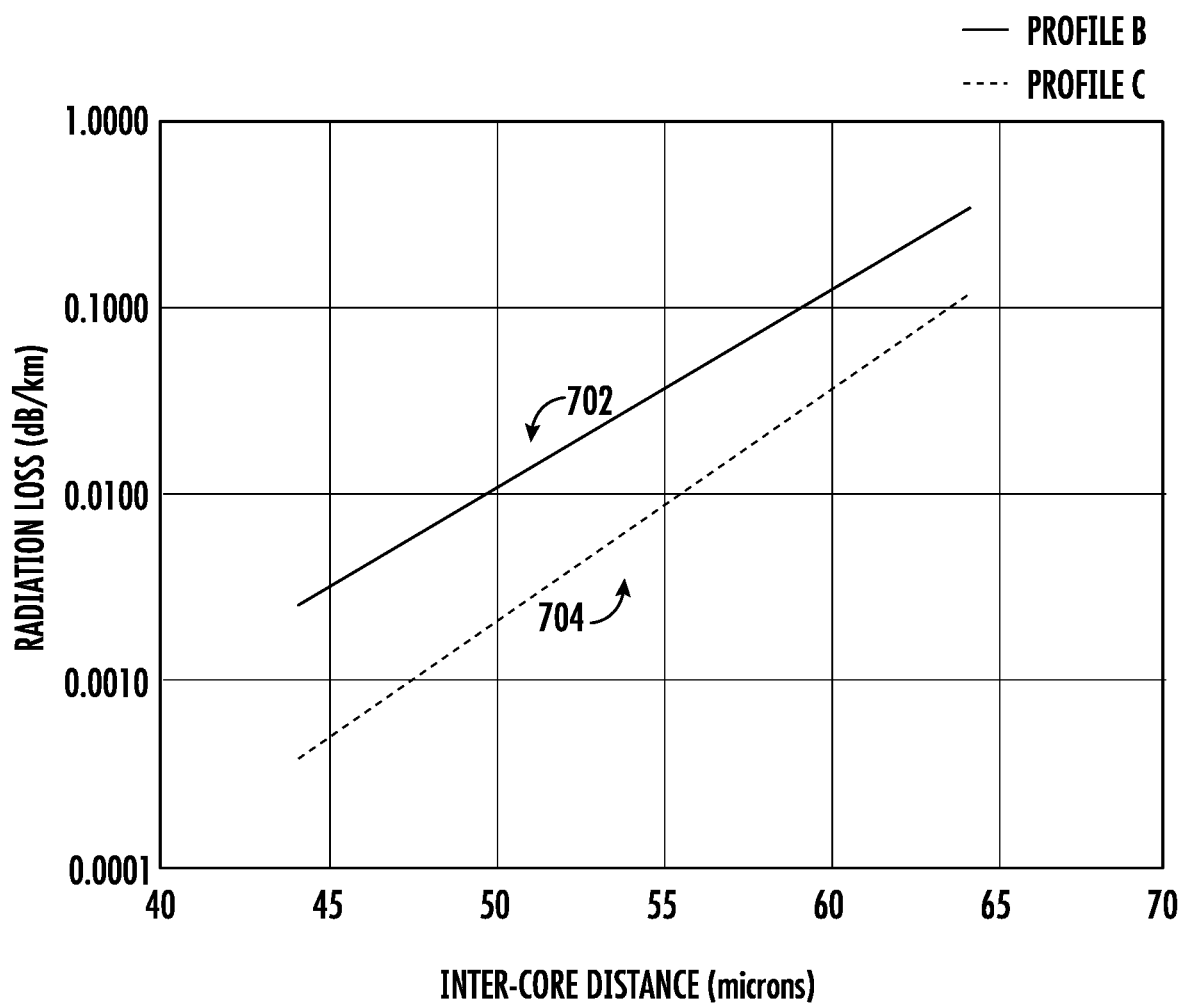
FIG. 8 depicts radiation loss as a function of inter-core distance for the two exemplary multicore optical fibers, according to one or more embodiments described herein.

The inter-core co-propagating cross-talk for Examples B and C as a function of inter-core distance is shown in FIG. 7A wherein Example B is shown by line 702 and Example C is shown by line 704. The inter-core counter-propagating cross-talk for Examples B (line 702) and C (line 704) as a function of inter-core distance is shown in FIG. 7B. The radiation loss for Examples B (line 702) and Example C (line 704) as a function of inter-core distance is shown in FIG. 8. The inter-core distance is chosen such that the co-propagating inter-core cross-talk is less than −30 dB/100 km, the counter-propagating inter-core cross-talk is less than −50 dB/100 km, and the radiation loss is less than 0.005 dB/km. In some embodiments, the inter-core distance is between 45 microns and 60 microns. In other embodiments, the inter-core distance is between 48 microns and 55 microns. The core-portions of each of the optical fibers described herein have a co-propagating cross talk of less than or equal to −30 dB/100 km with adjacent core portions. In some embodiments, the core-portions of each of the optical fibers described herein have a co-propagating cross talk of less than or equal to −40 dB/100 km with adjacent core portions. In other embodiments, the core-portions of each of the optical fibers described herein have a co-propagating cross talk of less than or equal to −50 dB/100 km with adjacent core portions. Furthermore, the core-portions of each of the optical fibers described herein have a counter-propagating cross talk of less than or equal to −50 dB/100 km with adjacent core portions. In some embodiments, the core-portions of each of the optical fibers described herein have a counter-propagating cross talk of less than or equal to −55 dB/100 km with adjacent core portions. In other embodiments, the core-portions of each of the optical fibers described herein have a counter-propagating cross talk of less than or equal to −60 dB/100 km with adjacent core portions.

Figure 9A:
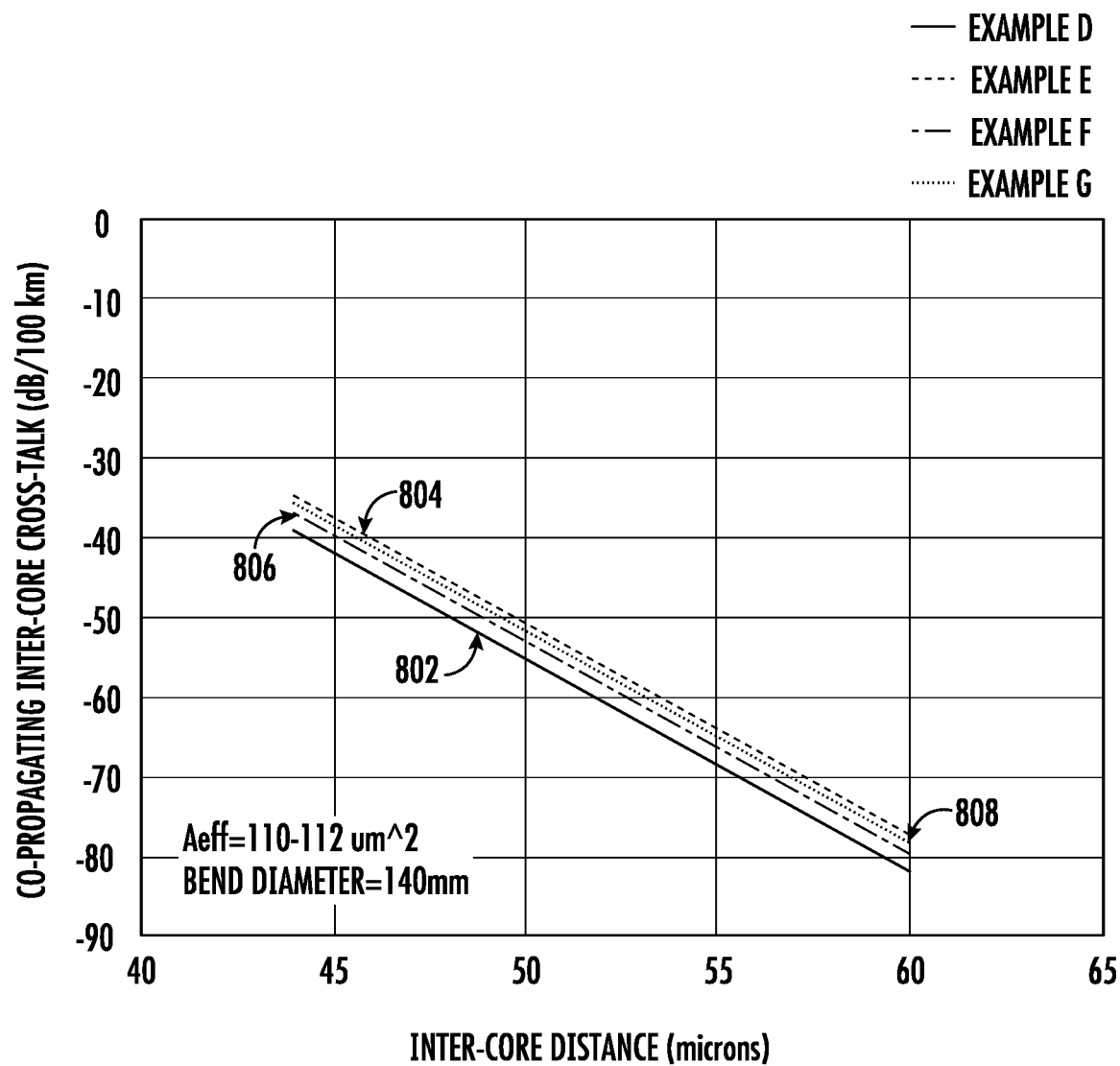
FIG. 9A depicts the co-propagating inter-core cross-talk as a function of inter-core distance for four exemplary multicore optical fibers, according to one or more embodiments described herein.
Figure 9B:
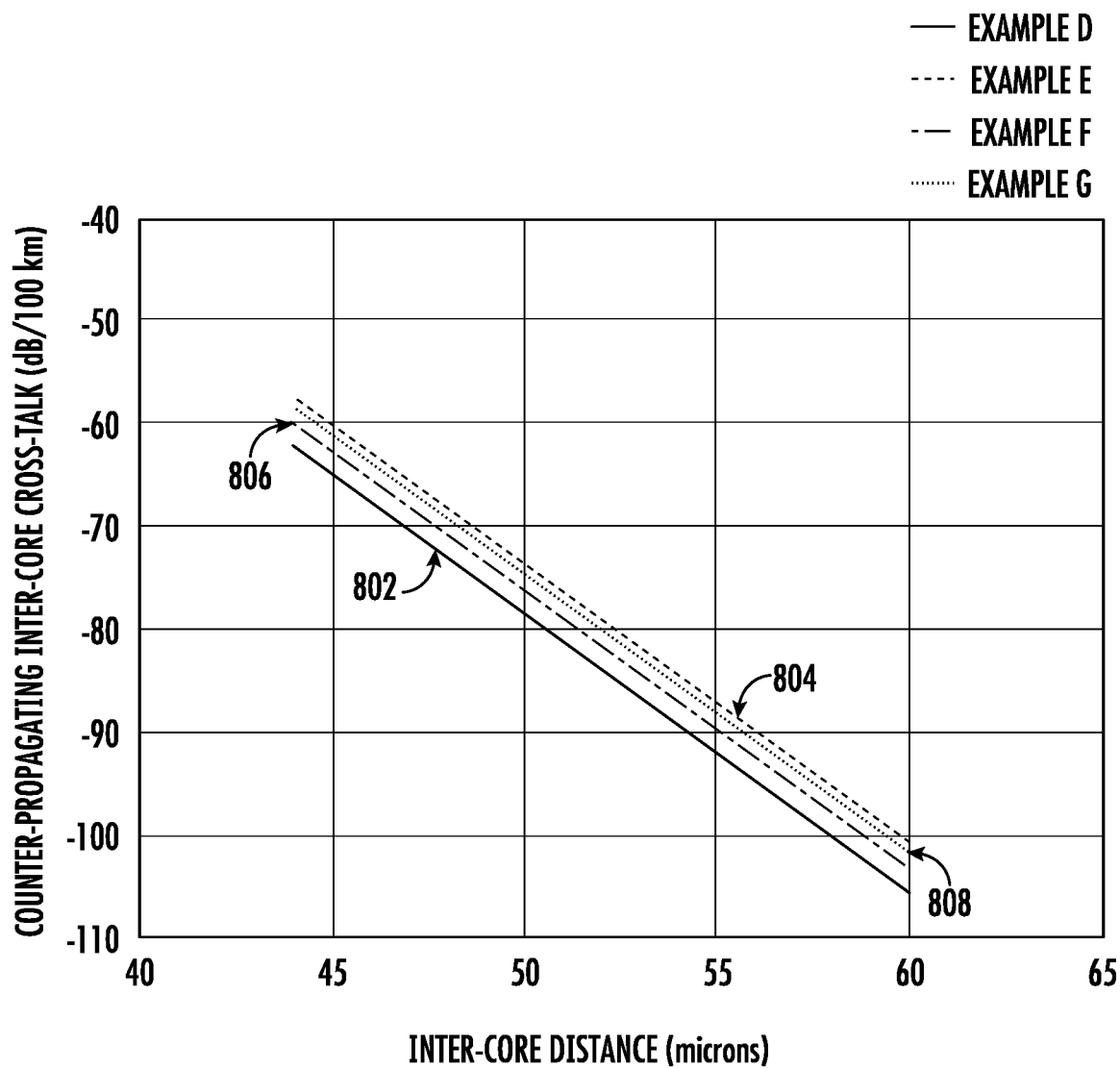
FIG. 9B depicts the counter-propagating inter-core cross-talk as a function of inter-core distance for the four exemplary multicore optical fibers, according to one or more embodiments described herein.

The invention is further illustrated through the following Examples D-G below. The co-propagating inter-core cross talk as a function of inter-core distance is shown in FIG. 9A where Example D is shown by line 802, Example E is shown by line 804, Example F is shown by line 806, Example G is shown by line 808. The counter-propagating inter-core cross talk as a function of inter-core distance is shown in FIG. 9B where Example D is shown by line 802, Example E is shown by line 804, Example F is shown by line 806, Example G is shown by line 808. The refractive index profile in each core portion, optical parameters and inter-core cross-talk are shown in Table 3 below.

As is apparent from the foregoing description, uncoupled-core multicore optical fibers comprising a plurality of core portions with offset depressed cladding trench regions surrounding core regions provide relatively low cross-talk among the core portions while achieving relatively high fiber density. Additionally, such offset depressed cladding trench cladding regions provide relatively low bend loss for the multicore optical fibers. Depressed cladding regions with relative refractive indexes that decrease monotonically with increasing radius may beneficially be produced by a method where the depressed cladding region is consolidated in a single step with a core region having a refractive index during doping. Embodiments of the present disclosure facilitate incorporating of a plurality of core portions (e.g., 2 core portions) into a standard 125 μm optical fiber while still providing relatively low cross talk (e.g., less than −40 dB/100 km) while maintaining a mode field diameter of each core portion to greater than or equal to 11 μm at 1550 nm.

It will be apparent to those skilled in the art that various modifications and variations can be made to the embodiments described herein without departing from the spirit and scope of the claimed subject matter. Thus it is intended that the specification cover the modifications and variations of

TABLE 3

Examples D, E, F and G

| Parameter | Example D | Example E | Example F | Example G |
| --- | --- | --- | --- | --- |
| Multicore Design | 1 × 2 | 1 × 2 | 1 × 2 | 1 × 2 |
| Core Index, % Δ1 | 0 | 0 | 0 | 0 |
| Core Radius, R1, microns | 5.55 | 5.55 | 5.55 | 5.55 |
| Core Alpha | 20 | 20 | 20 | 20 |
| Inner Cladding Index, % Δ2 | −0.245 | −0.245 | −0.245 | −0.245 |
| Inner Cladding Radius, R2, microns | 10 | 11 | 11 | 10 |
| Trench Index, % Δ3 | −0.555 | −0.555 | −0.555 | −0.505 |
| Trench Radius, R3, microns | 16.5 | 16.5 | 17 | 16.5 |
| Trench Shape | Rectangular | Rectangular | Rectangular | Rectangular |
| Common Cladding Index, % Δc | 0 | 0 | 0 | 0 |
| Trench Volume, % Δ micron2 | 53.39 | 46.88 | 47.68 | 44.78 |
| Cable Cutoff, nm | 1387 | 1368 | 1359 | 1362 |
| Effective Area, Aeff, at 1550 nm (microns^2) | 110.39 | 113.11 | 113.52 | 111 |
| Dispersion at 1550 nm (ps/nm/km) | 21.06 | 20.557 | 20.42 | 20.88 |

| Center-to-Center Spacing Between Centerline of Adjacent Core Portions (microns) | Co-Propagating Crosstalk at 1550 nm per 100 km Length of Fiber (dB) at Bend Diameter of 140 mm | | | |
| --- | --- | --- | --- | --- |
| 44 | −39.16 | −34.66 | −36.91 | −35.43 |
| 46 | −44.56 | −40.06 | −42.31 | −40.84 |
| 48 | −49.95 | −45.45 | −47.7 | −46.23 |
| 50 | −55.32 | −50.83 | −53.07 | −51.6 |
| 52 | −60.68 | −56.19 | −58.44 | −56.96 |
| 54 | −66.03 | −61.54 | −63.79 | −62.31 |
| 56 | −71.37 | −66.88 | −69.72 | −67.65 |
| 58 | −76.69 | −72.21 | −74.45 | −72.98 |
| 60 | −82.018 | −77.53 | −79.77 | −78.3 |

| Center-to-Center Spacing Between Centerline of Adjacent Core Portions (microns) | Counter-Propagating Crosstalk at 1550 nm per 100 km Length of Fiber (dB) at Bend Diameter of 140 mm | | | |
| --- | --- | --- | --- | --- |
| 44 | −62.25 | −57.65 | −59.96 | −58.45 |
| 46 | −67.69 | −63.16 | −65.43 | −63.95 |
| 48 | −73.09 | −68.58 | −70.84 | −69.36 |
| 50 | −78.46 | −73.97 | −76.21 | −74.74 |
| 52 | −83.82 | −79.33 | −81.58 | −80.1 |
| 54 | −89.17 | −84.68 | −86.93 | −85.45 |
| 56 | −94.51 | −90.08 | −92.86 | −90.79 |
| 58 | −99.83 | −95.35 | −97.59 | −96.12 |
| 60 | −105.15 | −100.67 | −102.93 | −101.44 |

What is claimed is:

1. An uncoupled core multicore optical fiber, comprising:
a common-cladding region having a refractive index $\Delta_{CC}$ and an outer radius $R_{CC}$; and
at least two core portions disposed within the common-cladding region, wherein each core portion comprises:
a central axis,
a core region extending from the central axis to an outer radius $r_1$, the core region comprising a relative refractive index $\Delta_1$ relative to pure silica, wherein each of the at least two core portions is doped with a dopant from a group comprising sodium, potassium, rubidium or combination thereof,
an inner-cladding region encircling and directly contacting the core region and extending from the outer radius $r_1$ to an outer radius $r_2$, the inner cladding region comprising a relative refractive index $\Delta_2$ relative to pure silica,
a trench region encircling and directly contacting the inner cladding region and extending from the outer radius $r_2$ to an outer radius $r_3$, the trench region comprising a relative refractive index $\Delta_3$ relative to pure silica and having a trench volume greater than or equal to 20% $\Delta$ micron$^2$ and less than or equal to 60% $\Delta$ micron$^2$,
the common cladding region encircling and directly contacting the trench region and extending from the outer radius $r_3$ to the outer radius $R_{CC}$ and
wherein the cable cutoff of each core portion is less than 1530 nm, wherein an effective area of each core portion is greater than or equal to 105 μm$^2$ and less than or equal to 135 μm$^2$ at a wavelength of 1550 nm and wherein the central axes of the at least two core portions are separated from one another by a minimum separation distance that is greater than or equal to 45 microns and less than or equal to 60 microns.

2. The multicore optical fiber of claim 1, wherein the outer diameter $2 \times R_{CC}$ of the common cladding is greater than or equal to 120 μm and less than or equal to 130 μm.

3. The multicore optical fiber of claim 1, wherein the outer diameter $2 \times R_{CC}$ of the common cladding is greater than or equal to 124 μm and less than or equal to 126 μm.

4. The multicore optical fiber of claim 1, wherein effective area of each of the core portions is greater than or equal to 110 μm$^2$ and less than or equal to 130 μm$^2$ at a wavelength of 1550 nm.

5. The multicore optical fiber of claim 1, wherein the multicore optical fiber has an average attenuation of less than 0.16 dB/km.

6. The multicore optical fiber of claim 1, wherein the trench volume of the trench region is greater than or equal to 30% $\Delta$ micron$^2$ and less than or equal to 55% $\Delta$ micron$^2$.

7. The multicore optical fiber of claim 1, wherein the core radius $r_1$ is greater than or equal to 3.0 microns and less than or equal to 7.0 microns.

8. The multicore optical fiber of claim 1, wherein the outer radius $r_3$ of the trench region is about 11 microns to about 20 microns.

9. The multicore optical fiber of claim 1, wherein the mode field diameter of each core portion is about 11 μm to about 15 μm at a 1550 nm wavelength.

10. The multicore optical fiber of claim 1, wherein a cable cutoff wavelength of each of the plurality of core portions is greater than or equal to 1300 nm and less than or equal to 1530 nm.

11. The multicore optical fiber of claim 1, wherein the central axes of the at least two core portions are separated from one another by a minimum separation distance that is greater than or equal to 48 microns and less than or equal to 55 microns.

12. The multicore optical fiber of claim 1, wherein a co-propagating cross-talk between the at least two core portions is about −30 dB or less per 100 km of optical fiber.

13. The multicore optical fiber of claim 1, wherein a co-propagating cross-talk between the at least two core portions is about −50 dB or less per 100 km of optical fiber.

14. The multicore optical fiber of claim 1, wherein counter-propagating cross-talk between the at least two core portions is about −35 dB or less per 100 km of optical fiber.

15. The multicore optical fiber of claim 1, wherein counter-propagating cross-talk between the at least two core portions is about −40 dB or less per 100 km of optical fiber.

16. The multicore optical fiber of claim 1, wherein counter-propagating cross talk between the at least two core portions is about −45 dB or less per 100 km of optical fiber.

17. The core multicore optical fiber of claim 1, wherein the refractive index profile of each core portion within the core region is a graded index profile.

18. The multicore optical fiber of claim 1, wherein the relative refractive index $\Delta_3$ of the trench region of each core portion continuously decreases from $\Delta_2$ at the radius $r_2$ to a minimum relative refractive index 43 min at $r_3$ such that the trench has a substantially triangular-shape.

19. The multicore optical fiber of claim 1, wherein the relative refractive index $\Delta_3$ of the trench region of each core portion remains substantially constant at a minimum relative refractive index $\Delta_{3min}$ from the radius $r_2$ to radius $r_3$ such that the trench region has a substantially rectangular-shape.

20. The multicore optical fiber of claim 1, wherein the average concentration of the alkali in the core portion is in the range from 20 ppm to 500 ppm.

* * * * *